(12) United States Patent
Hattori

(10) Patent No.: US 7,990,479 B2
(45) Date of Patent: Aug. 2, 2011

(54) COMMUNICATION SYSTEM AND COMMUNICATION METHOD

(75) Inventor: Yoshikatsu Hattori, Kyoto (JP)

(73) Assignee: Panasonic Corporation, Osaka (JP)

( * ) Notice: Subject to any disclaimer, the term of this patent is extended or adjusted under 35 U.S.C. 154(b) by 1279 days.

(21) Appl. No.: 11/569,202

(22) PCT Filed: Mar. 19, 2005

(86) PCT No.: PCT/JP2005/009155
§ 371 (c)(1),
(2), (4) Date: Nov. 16, 2006

(87) PCT Pub. No.: WO2005/114991
PCT Pub. Date: Dec. 1, 2005

(65) Prior Publication Data
US 2008/0231685 A1   Sep. 25, 2008

(30) Foreign Application Priority Data

May 21, 2004 (JP) ................................ 2004/151544
May 21, 2004 (JP) ................................ 2004/151545

(51) Int. Cl.
*H04N 5/38* (2006.01)
*H04N 5/50* (2006.01)
*H04N 3/27* (2006.01)

(52) U.S. Cl. .................... 348/723; 348/554; 348/731

(58) Field of Classification Search .............. 348/554, 348/553, 706, 731, 552, 730, 723, 570; 386/218, 386/219; 710/15, 18, 19; 455/3.06; 725/37
See application file for complete search history.

(56) References Cited

U.S. PATENT DOCUMENTS

| 5,701,599 | A | * | 12/1997 | Aihara ....................... 455/186.1 |
| 6,072,541 | A | * | 6/2000 | Song ............................ 348/706 |
| 6,710,816 | B1 | | 3/2004 | Minami |
| 6,943,828 | B1 | * | 9/2005 | Grimes et al. ................ 348/194 |
| 7,289,166 | B2 | * | 10/2007 | Kimura ......................... 348/730 |
| 7,436,459 | B2 | * | 10/2008 | Tanaka et al. ................ 348/570 |
| 7,707,612 | B2 | * | 4/2010 | Frisco et al. ................... 725/76 |
| 7,750,977 | B2 | * | 7/2010 | Dinwiddie .................... 348/569 |
| 2002/0039393 | A1 | | 4/2002 | Shibata et al. |
| 2002/0059585 | A1 | | 5/2002 | Maeda et al. |

(Continued)

FOREIGN PATENT DOCUMENTS

CN   1336759   2/2002

(Continued)

OTHER PUBLICATIONS

English Language Abstract of JP 2002-111615, Dec. 2002.

(Continued)

*Primary Examiner* — Victor Kostak
(74) *Attorney, Agent, or Firm* — Greenblum & Bernstein, P.L.C.

(57) ABSTRACT

A transmitting device transmits a video signal and an audio signal based on a television broadcasting signal, or a still picture signal and a silence signal as a transmission signal to a receiving device. The receiving device supplies the video signal and the audio signal transmitted from the transmitting device, or a video signal and an audio signal inputted from external equipment to a video and audio output unit. In the receiving device, when the video signal and the audio signal inputted from the external equipment have been supplied to the video and audio output unit, the still picture signal and the silence signal are transmitted from the transmitting device to the receiving device.

18 Claims, 21 Drawing Sheets

U.S. PATENT DOCUMENTS

| | | | |
|---|---|---|---|
| 2003/0177497 A1* | 9/2003 | Macrae et al. | 725/60 |
| 2004/0003399 A1* | 1/2004 | Cooper | 725/38 |
| 2004/0019813 A1 | 1/2004 | Kobayashi | |
| 2004/0060066 A1 | 3/2004 | Seki et al. | |
| 2004/0098741 A1* | 5/2004 | Hara | 725/37 |
| 2005/0081244 A1* | 4/2005 | Barrett et al. | 725/97 |
| 2006/0097955 A1* | 5/2006 | Kato | 345/1.1 |
| 2007/0002186 A1 | 1/2007 | Maeda et al. | |
| 2007/0064157 A1 | 3/2007 | Kasamatsu | |

FOREIGN PATENT DOCUMENTS

| | | |
|---|---|---|
| EP | 1164790 | 12/2001 |
| EP | 1617648 | 1/2006 |
| JP | 7-115641 | 5/1995 |
| JP | 2000-260169 | 9/2000 |
| JP | 2001-007722 | 1/2001 |
| JP | 2001-007722 | 11/2001 |
| JP | 2001-358966 | 12/2001 |
| JP | 2002-158888 | 5/2002 |
| JP | 2002-111615 | 12/2002 |
| JP | 2004-343725 | 12/2004 |
| JP | 2005-094451 | 4/2005 |
| WO | 2004/107745 | 12/2004 |

OTHER PUBLICATIONS

English Language Abstract and English Language Translation of Paragraphs [0035], [0044]-[0048], [0056], [0057], Description of the Drawings, and Description of the Reference Characters of JP 2000-260169, Sep. 2000.

English Language Abstract of JP 7-115641, May 1995.

English Language Abstract of JP 2001-007722. Jan. 2001.

English Language Abstract of JP 2005-094451, Apr. 2005.

English Language Abstract of JP 2001-358966, Dec. 2001.

English Language Abstract of JP 2004-343725, Dec. 2004.

Front page of the pamphlet of announced Patent Specification in corresponding Chinese Application 200580016458.5, May 5, 2010.

Partial translation of JP 7-115641, May 2, 1995.

English language Abstract of JP 2002-158888, May 31, 2002.

* cited by examiner

FIG. 2A

| TYPE | IDENTIFICATION NUMBER | DESTINATION ADDRESS | TRANSMISSION SOURCE ADDRESS | CONTROL INFORMATION |
|---|---|---|---|---|
| F1 | F2 | F3 | F4 | F5 |

FIG. 2B

| TYPE | IDENTIFICATION NUMBER | DESTINATION ADDRESS | TRANSMISSION SOURCE ADDRESS |
|---|---|---|---|
| F6 | F7 | F8 | F9 |

F I G. 2 1
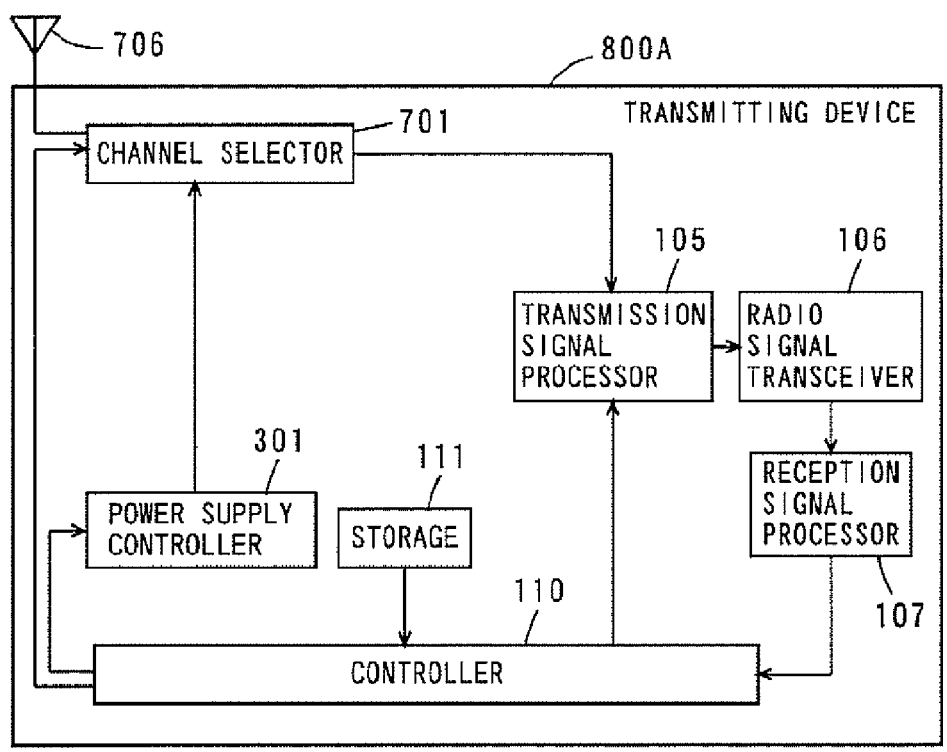

COMMUNICATION SYSTEM AND COMMUNICATION METHOD

TECHNICAL FIELD

The present invention relates to a communication system that receives a broadcasting signal of television broadcasting or the like, and a communication method.

BACKGROUND ART

Conventionally, there has been known a system including a receiving device that receives a broadcasting signal of television broadcasting or the like and a video and audio output device that outputs the broadcasting signal as video and audio, separately, which transmits the broadcasting signal from the receiving device to the video and audio output device through radio communication.

For example, a television receiving system described in Patent Document 1 includes a channel selecting device and a display device separately, in which broadcasting signals are received and subjected to channel selection by the channel selecting device, and this broadcasting signal subjected to the channel selection is transmitted to the display device by radio.
[Patent Document 1] JP 2001-358966 A

DISCLOSURE OF THE INVENTION

Problems to be Solved by the Invention

In the television receiving system described in the above-described Patent Document 1, when the power supplies of the channel selecting device and the display device are on, radio transmission is always performed between the channel selecting device and the display device. Therefore, for example, when an external device such as a video cassette recorder or a DVD (digital versatile disk) player is connected to the display device, and a video signal from the external device is displayed on the display device, radio communication is also performed between the channel selecting device and the display device. This causes power to be consumed in the channel selecting device due to the radio communication having no relation with video being currently displayed on the display device.

Means for Solving the Problems

An object of the present invention is to provide a communication system and a communication method in which power consumption can be sufficiently reduced.

(1)

A communication system according to one aspect of the present invention is a communication system that receives a broadcasting signal, and to which an external device can be connected, the communication system including a transmitting device and a receiving device, wherein the transmitting device includes a receiver that receives the broadcasting signal, a first communicator that transmits the broadcasting signal received by the receiver to the receiving device, and a first controller that controls the transmission of the broadcasting signal to the receiving device, and the receiving device includes a second communicator that receives the broadcasting signal transmitted from the transmitting device, an acquirer that acquires an external signal from the external device, and a first selector that selectively outputs the broadcasting signal from the second communicator and the external signal from the acquirer, and wherein the first controller controls the transmission of the broadcasting signal so that an amount of the broadcasting signal at the time of output of the external signal by the first selector is smaller than an amount of the broadcasting signal at the time of output of the broadcasting signal by the first selector.

In this communication system, the broadcasting signal is received by the receiver of the transmitting device, and the broadcasting signal is transmitted to the receiving device by the first communicator. The broadcasting signal transmitted to the receiving device by the first communicator is received by the second communicator of the receiving device. The external device can be connected to the receiving device, and the external signal from the external device can be acquired by the acquirer. The broadcasting signal received by the second communicator and the external signal acquired by the acquirer are selectively outputted by the first selector of the receiving device. The first controller controls the transmission of the broadcasting signal from the transmitting device to the receiving device so that the amount of the broadcasting signal transmitted from the transmitting device to the receiving device when the external signal is outputted by the first selector is smaller than the amount of the broadcasting signal transmitted from the transmitting device to the receiving device when the broadcasting signal is outputted by the first selector.

In this case, since the amount of the broadcasting signal transmitted from the transmitting device to the receiving device becomes smaller when the external signal is outputted by the first selector, the communication amount between the transmitting device and the receiving device is reduced. This can sufficiently reduce the power consumption of the transmitting device and the receiving device.

(2)

The first controller may stop the transmission of the broadcasting signal to the receiving device when the external signal is outputted by the first selector.

In this case, the communication amount between the transmitting device and the receiving device is largely reduced. This can further reduce the power consumption of the transmitting device and the receiving device.

(3)

The transmitting device may further include a still picture generator that generates a still picture signal, and a second selector that selectively outputs the broadcasting signal from the receiver and the still picture signal from the still picture generator to the first communicator, and wherein the first controller may output the still picture signal by the second selector when the external signal is outputted by the first selector, and the first communicator may transmit the still picture signal outputted by the second selector to the receiving device.

In this case, the broadcasting signal received by the receiver and the still picture signal generated by the still picture generator are selectively outputted by the second selector. When the external signal is outputted by the first selector of the receiving device, the still picture signal is outputted by the second selector, and the still picture signal is transmitted to the receiving device by the first communicator. That is, when the external signal is outputted by the first selector of the receiving device, the still picture signal is transmitted from the transmitting device to the receiving device. Here, the amount of the still picture signal is smaller than the amount of the broadcasting signal. Accordingly, since the communication amount between the transmitting device and the receiving device is reduced, the power consumption of the transmitting device and the receiving device can be sufficiently reduced.

(4)

The transmitting device may further include a silence signal generator that generates a silence signal, and wherein the first controller may output the still picture signal and the silence signal by the second selector when the external signal is outputted by the first selector, and the first communicator may transmit the still picture signal and the silence signal outputted by the second selector to the receiving device.

In this case, when the external signal is outputted by the first selector of the receiving device, the still picture signal and the silence signal are outputted by the second selector, and the still picture signal and the silence signal are transmitted to the receiving device by the first communicator. That is, when the external signal is outputted by the first selector of the receiving device, the still picture signal and the silence signal are transmitted to the transmitting device to the receiving device. Here, the amount of the still picture signal and the amount of the silence signal are smaller than the amount of the broadcasting signal. Accordingly, since the communication amount between the transmitting device and the receiving device is reduced, the power consumption of the transmitting device and the receiving device can be sufficiently reduced.

(5)

The first controller may stop power supply to the receiver when the external signal is outputted by the first selector.

In this case, when the external signal is outputted by the first selector, the power supply to the receiver is stopped, and thus, the power consumption of the transmitting device can surely be reduced.

(6)

The receiver may include an encoder that encodes the broadcasting signal, the second communicator may include a decoder that decodes the broadcasting signal encoded by the encoder, and the receiving device may further include a second controller that stops power supply to the decoder when the external signal is outputted by the first selector.

In this case, the broadcasting signal is transmitted to the transmitting device by the first communicator after being encoded by the encoder of the receiver, and is decoded by the decoder of the second communicator. When the external signal is outputted by the first selector of the receiving device, the power supply to the decoder is stopped. This can surely reduce the power consumption of the receiving device.

(7)

The receiving device may further include an information generator that generates a predetermined information signal, and an instructor that instructs switching of the signal to be outputted from the first selector, and wherein when the switching from the external signal to the broadcasting signal is instructed by the instructor, the first selector may output the broadcasting signal after outputting the predetermined information signal generated by the information generator for a predetermined period of time.

In this case, the predetermined information signal is generated by the information signal generator in the receiving device. When the switching from the external signal to the broadcasting signal is instructed by the instructor, the information signal is outputted from the first selector for the predetermined period of time before the broadcasting signal is outputted.

This can prevent the occurrence of a period of time when no signal is outputted from the first selector at the time of switching between the external signal and the broadcasting signal. Accordingly, when the signal outputted from the first selector is outputted to a display device, a period of time when no image is outputted to the display device can be surely prevented from occurring. As a result, the viewer can recognize the fact that the communication device and the receiving device are operating normally.

(8)

The predetermined period of time may be a period of time from the time when the switching to the broadcasting signal is instructed by the instructor to the time when the broadcasting signal is enabled to be outputted.

In this case, the information signal is outputted from the first selector from the time when the switching from the external signal to the broadcasting signal is instructed by the instructor to the time when the broadcasting signal is enabled to be outputted by the first selector. This can surely prevent a period of time when no signal is outputted from the first selector from occurring. Accordingly, when the signal outputted from the first selector is outputted to a display device, a period of time when no image is outputted to the display device can be surely prevented from occurring. As a result, the viewer can surely recognize the fact that the communication device and the receiving device are operating normally.

(9)

The receiving device may further include a control signal generator that generates a control signal indicating that the switching of the signal has been instructed by the instructor, and wherein the second communicator may transmit the control signal to the transmitting device, and when the switching from the external signal to the broadcasting signal is instructed by the instructor, the first selector may output the information signal generated by the information generator for a period of time from the time when the control signal is transmitted to the transmitting device by the second communicator to the time when the broadcasting signal is enabled to be outputted.

In this case, when the switching from the external signal to the broadcasting signal is instructed by the instructor, the control signal indicating the fact is generated by the control signal generator, and the control signal is transmitted to the transmitting device by the second communicator. The first selector outputs an information signal from the time when the above-described control signal is transmitted to the transmitting device by the second communicator to the time when the broadcasting signal is enabled to be outputted.

This can surely prevent the occurrence of a period of time when no signal is outputted from the first selector at the time of switching between the external signal and the broadcasting signal. Accordingly, when the signal outputted from the first selector is outputted to the display device, a period of time when no image is outputted to the display device can be surely prevented from occurring. As a result, the viewer can surely recognize the fact that the communication device and the receiving device are operating normally.

(10)

The receiving device may further include a control signal generator that generates a control signal indicating that the switching of the signal has been instructed by the instructor, the second communicator may transmit the control signal to the transmitting device, the first communicator may receive the control signal transmitted from the receiving device, the transmitting device may further include a response signal generator that generates a response signal in response to the reception of the control signal by the first communicator, the first communicator may transmit the response signal generated by the response signal generator to the receiving device, the second communicator may receive the response signal transmitted by the transmitting device, and when the switching from the external signal to the broadcasting signal is instructed by the instructor, the first selector may output the information signal generated by the information generator for a period of time from the time when the response signal is received by the second communicator to the time when the broadcasting signal is enabled to be outputted.

In this case, when the switching from the external signal to the broadcasting signal is instructed by the instructor, the control signal indicating the fact is generated by the control signal generator, and the control signal is transmitted to the transmitting device by the second communicator. The control signal transmitted by the second communicator is received by the first communicator of the transmitting device, and the response signal is generated by the response signal generator in response to the reception. Furthermore, the response signal is transmitted to the receiving device by the first communicator, and received by the second communicator in the receiving device. The first selector outputs the information signal from the time when the above-described response signal is transmitted to the transmitting device by the second communicator to the time when the broadcasting signal is enabled to be outputted.

This can surely prevent the occurrence of a period of time when no signal is outputted from the first selector at the time of switching between the external signal and the broadcasting signal. Accordingly, when the signal outputted from the first selector is outputted to the display device, a period of time when no image is outputted to the display device can be surely prevented from occurring. As a result, the viewer can surely recognize the fact that normal operation of the communication device and the receiving device are operating normally.

Moreover, since the response signal is transmitted from the transmitting device in response to the control signal transmitted from the receiving device, the communication state between the receiving device and the transmitting device can be displayed. This allows the viewer to arrange the transmitting device and the receiving device so that the communication state between the transmitting device and the receiving device is improved.

(11)

The information generator may extract the predetermined information signal from the signal received by the second communicator. In this case, the information signal can be easily generated. Also, since the information signal need not be externally inputted to the receiving device, the configuration of the receiving device can be simplified.

(12)

The information generator may prestore the predetermined information signal. In this case, since the information signal is prestored in the information generator, the information signal can be surely outputted from the first selector. Furthermore, when the signal outputted from the first selector is outputted to the display device, the information desired by the user can be displayed on the display device.

(13)

The predetermined information signal may be a still picture signal. In this case, since the amount of the still picture signal is small, the power consumption in the receiving device can be reduced when the external signal outputted from the first selector is switched to the broadcasting signal.

(14)

The receiving device may further include an information generator that generates a predetermined information signal, and an instructor that instructs switching of the signal to be outputted from the first selector, and wherein when the switching from the external signal to the broadcasting signal is instructed by the instructor, the first controller may start power supply to the receiver, and when the switching from the external signal to the broadcasting signal is instructed by the instructor, the first selector may output the broadcasting signal after outputting the predetermined information signal generated by the information generator for a predetermined period of time.

In this case, the predetermined information signal is generated by the information signal generator in the receiving device. When the switching from the external signal to the broadcasting signal is instructed by the instructor, the power supply to the receiver is started in the transmitting device, and the information signal is outputted for the predetermined period of time before the broadcasting signal is outputted in the first selector of the receiving device.

This can prevent the occurrence of a period of time when no signal is outputted from the first selector at the time of switching between the external signal and the broadcasting signal. Furthermore, since the power supply to the receiver is started after the switching from the external signal to the broadcasting signal is instructed by the instructor, the power consumption of the transmitting device can be surely reduced.

(15)

The first communicator and the second communicator may perform radio communication. In this case, wiring of a cable or the like that connects the transmitting device and the receiving device becomes unnecessary.

(16)

A communication method according to another aspect of the present invention is a communication method between a transmitting device that receives a broadcasting signal and a receiving device to which an external device can be connected, including the steps of receiving the broadcasting signal by the transmitting device, transmitting the received broadcasting signal to the receiving device by the transmitting device, receiving the broadcasting signal transmitted from the transmitting device by the receiving device, acquiring an external signal from the external device in the receiving device, selectively outputting the broadcasting signal and the external signal by the receiving device, and controlling the transmission of the broadcasting signal so that an amount of the broadcasting signal transmitted from the transmitting device to the receiving device when the external signal is outputted by the receiving device is smaller than an amount of the broadcasting signal transmitted from the transmitting device to the receiving device when the broadcasting signal is outputted by the receiving device.

In this communication method, the broadcasting signal is received by the transmitting device, and the broadcasting signal is transmitted to the receiving device. By the receiving device, the broadcasting signal transmitted from the transmitting device is received. Furthermore, in the receiving device, the external signal is acquired from the external device. The broadcasting signal and the external signal are selectively outputted by the receiving device. The transmission of the broadcasting signal is controlled so that the amount of the broadcasting signal transmitted from the transmitting device to the receiving device when the external signal is outputted by the receiving device is smaller than the amount of the broadcasting signal transmitted from the transmitting device to the receiving device when the broadcasting signal is outputted by the receiving device.

In this case, since the amount of the broadcasting signal transmitted from the transmitting device to the receiving device becomes smaller when the external signal is outputted in the receiving device, the communication amount between the transmitting device and the receiving device is reduced. This can sufficiently reduce the power consumption of the transmitting device and the receiving device.

(17)

The step of controlling may include the step of stopping the transmission of the broadcasting signal to the receiving device.

In this case, the communication amount between the transmitting device and the receiving device is largely reduced. This can further reduce the power consumption of the transmitting device and the receiving device.

(18)

The communication method may further include the step of generating a still picture signal in the transmitting device, wherein the step of stopping may include the step of transmitting the still picture signal to the receiving device.

In this case, when the external signal is outputted by the receiving device, the still picture signal is transmitted from the transmitting device to the receiving device. Here, the amount of the still picture signal is smaller than the amount or the broadcasting signal. Accordingly, since the communication amount between the transmitting device and the receiving device is reduced, the power consumption of the transmitting device and the receiving device can be sufficiently reduced.

(19)

The communication method may further include the step of generating a silence signal in the transmitting device, wherein the step of stopping may include the step of transmitting the still picture signal and the silence signal to the receiving device.

In this case, when the external signal is outputted by the receiving device, the still picture signal and the silence signal are transmitted from the transmitting device to the receiving device. Here, the amount of the still picture signal and the amount of the silence signal are smaller than the amount of the broadcasting signal. Accordingly, since the communication amount between the transmitting device and the receiving device is reduced, the power consumption of the transmitting device and the receiving device can be sufficiently reduced.

(20)

The step of receiving the broadcasting signal by the transmitting device may include the step of receiving the broadcasting signal by a receiver, and the step of controlling may include the step of stopping power supply to the receiver.

In this case, the broadcasting signal is received by the receiver in the transmitting device. When the external signal is outputted by the receiving device, the power supply to the receiver is stopped. This can surely reduce the power consumption of the transmitting device.

(21)

The step of receiving the broadcasting signal by the transmitting device may include the step of encoding the broadcasting signal by an encoder, and the step of receiving the broadcasting signal transmitted from the transmitting device by the receiving device may include the step of decoding the broadcasting signal by a decoder, the communication method may further include the step of stopping power supply to the decoder when the external signal is outputted by the receiving device.

In this case, the broadcasting signal encoded in the transmitting device is decoded in the receiving device. When the external signal is outputted by the receiving device, the power supply to the decoder is stopped. This can surely reduce the power consumption of the receiving device.

BRIEF DESCRIPTION OF THE DRAWINGS

FIG. 2A is a diagram showing a field structure of a control signal.

FIG. 2B is a diagram showing a field structure of a response signal.

FIG. 21 is a block diagram showing a configuration of a transmitting device adapted to a digital television broadcasting signal.

BEST MODE FOR CARRYING OUT THE INVENTION

Hereinafter, communication systems in the embodiments of the present invention are described in detail, using the drawings.

(1) First Embodiment (a) Configuration of Communication System

Figure 1:
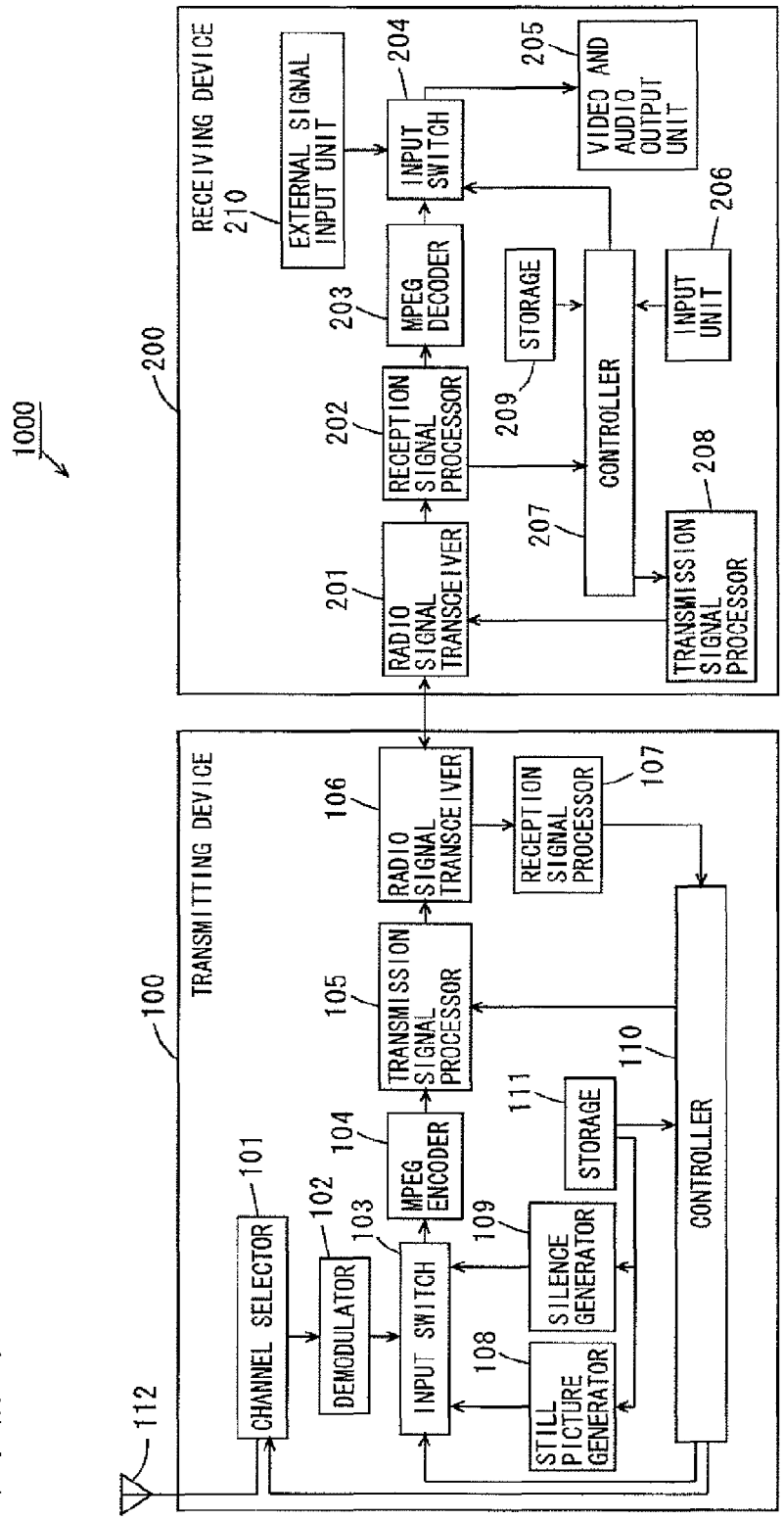
FIG. 1 is a block diagram showing a configuration of a communication system according to a first embodiment of the present invention.

FIG. 1 is a block diagram showing a configuration of a communication system according to a first embodiment of the present invention.

As shown in FIG. 1, a communication system 1000 according to the present embodiment is composed of a transmitting device 100 and a receiving device 200.

The transmitting device 100 includes a channel selector 101, a demodulator 102, an input switch 103, an MPEG encoder 104, a transmission signal processor 105, a radio signal transceiver 106, a reception signal processor 107, a still picture generator 108, a silence generator 109, a controller 110, and a storage 111.

The receiving device 200 includes a radio signal transceiver 201, a reception signal processor 202, an MPEG decoder 203, an input switch 204, a video and audio output unit 205, an input unit 206, a controller 207, a transmission signal processor 208, a storage 209, and an external signal input unit 210.

The channel selector 101 of the transmitting device 100 selects a television broadcasting signal corresponding to a channel selection signal generated by the controller 110 described later from a plurality of analog television broadcasting signals corresponding to a plurality of channels which are inputted through an antenna 112.

The demodulator 102 demodulates the television broadcasting signal selected by the channel selector 101 into a video signal (motion picture signal) and an audio signal.

The input switch 103 outputs the video signal and the audio signal demodulated by the demodulator 102, or a still picture signal generated by the still picture generator 108 described later and a silence signal generated by the silence generator 109 described later, based on an input switching signal generated by the controller 110 described later.

The MPEG encoder 104 compression-encodes an output signal of the input switch 103 in an MPEG (Motion Picture Experts Group) method.

The transmission signal processor 105 converts the signal encoded by the MPEG encoder 104 and a response signal generated by the controller 110 described later into signals compliant with a predetermined communication protocol (e.g. IEEE 802, 11a), respectively, and generates a transmission signal by applying predetermined modulation processing, amplification processing and the like.

The radio signal transceiver 106 transmits the transmission signal generated by the transmission signal processor 105 as a radio signal to the radio signal transceiver 201 of the receiving device 200, and supplies the radio signal received from the radio signal transceiver 201 described later to the reception signal processor 107 as a reception signal.

The reception signal processor 107 applies predetermined demodulation processing and the like to the reception signal supplied from the radio signal transceiver 106 to extract a control signal described later.

The still picture generator 108 generates the still picture signal from still picture information stored in the storage 111 described later. The still picture signal may be generated from the video signal demodulated by the demodulator 102.

The silence generator 109 generates the silence signal from silence information stored in the storage 111 described later. The silence signal may be generated from the audio signal demodulated by the demodulator 102.

The controller 110 generates the response signal, the input switching signal, and the channel selection signal, based on the control signal extracted by the reception signal processor 107. The response signal is described later.

The storage 111 stores an internal state (power supply states of respective components and the like) of the transmitting device 100, information of the receiving device 200 (a model identification code, the power supply states of respective components, and the like), the still picture information, the silence information and the like.

The radio signal transceiver 201 of the receiving device 200 transmits a transmission signal generated by the transmission signal processor 208 described later to the radio signal transceiver 106 of the transmitting device 100 as the radio signal, and supplies the radio signal received from the radio signal transceiver 106 supplies to the reception signal processor 202 as the reception signal.

The reception signal processor 202 separates the encoded video signal and audio signal, or separates the encoded still picture signal and silence signal by applying the predetermined demodulation processing and the like to the reception signal supplied from the radio signal transceiver 201, and further extracts the response signal.

The MPEG decoder 203 expansion-decodes the encoded video signal and audio signal or the encoded still picture signal and silence signal, which have been separated by the reception signal processor 202.

The input switch 204 supplies the video signal and the audio signal decoded by the MPEG decoder 203, or the video signal and the audio signal supplied from the external signal input unit 210 described later (hereinafter, refer to an external input signal) to the video and audio output unit 205, based on an input switching signal generated by the controller 207 described later.

The video and audio output unit 205 includes a display device such as a liquid crystal display panel or a plasma display panel, and an audio output device such as a speaker, and displays the video signal or the still picture signal supplied from the input switch 204 as video, and outputs the audio signal or the silence signal supplied from the input switch 204 as audio.

The input unit 206 supplies the controller 207 input switching information and channel selection information supplied from the input device (not shown) such as a remote controller. The input switching information is information specifying which of the output signal of the MPEG decoder 203 and the external input signal is to be supplied to the video and audio output unit 205, and the channel selection information is information specifying a television broadcasting signal of a channel to be selected among the television broadcasting signals of the plurality of channels inputted from the antenna 112.

The external signal input unit 210 supplies the input switch 204 the video signal and the audio signal generated by external equipment (not shown) such as a videocassette recorder and a DVD player.

For example, when a user watches and listens to a DVD, the user operates the remote controller to supply the controller 207 the input switching information for switching the signal to be supplied to the video and audio output unit 205 into the external input signal. Moreover, for example, when the user tries to change the channel of the television broadcasting signal, the user operates the remote controller to supply the controller 207 the channel selection information for selecting the television broadcasting signal of a desired channel.

The controller 207 generates the control signal based on the input switching information or the channel selection information supplied from the input unit 206, and information of the transmitting device 100, which is stored in the storage 209 described laser. The controller 207 generates the input switching signal based on the input switching information. The control signal will be described later.

The transmission signal processor 208 converts the control signal generated by the controller 207 into a signal compliant with a predetermined communication protocol (e.g. IEEE 802.11a), and generates the transmission signal by applying predetermined modulation processing, amplification processing and the like.

The storage 209 stores an internal state (power supply states of respective components and the like) of the receiving device 200 and the information of the transmitting device 100 (the model identification code, power supply states of respective components, and the like).

(b) Structure of Control Signal and Response Signal

Now, the above-described control signal and response signal are briefly described using the drawings. FIG. 2A is a diagram showing a field structure of the control signal, and FIG. 2B is a diagram showing a field structure of the response signal.

As shown in FIG. 2A, the control signal has fields F1 to F5.

In the fields F1 to F5, "type", "identification number", "destination address", "transmission source address" and "control information" are stored, respectively.

The type indicates a type of the signal (control signal). The identification number is a unique number for identifying each signal. The destination address indicates a transmission destination of the control signal, that is, an address number of the transmitting device 100. In the present embodiment, the address numbers are preset for the transmitting device 100 and the receiving device 200. The transmission source address indicates a sending source of the control signal, that is, an address number of the receiving device 200. The control information indicates the input switching information or the channel selection information.

As shown in FIG. 2B, the response signal has fields F6 to F9.

In the fields F6 to F9, "type", "identification number", "destination address", and "transmission source address" are stored, respectively.

The type indicates a type of the signal (response signal). The identification number is a unique number for identifying each signal. As the identification number of the response signal, the identification number of the control signal is copied and used. The destination address indicates a transmission destination of the response signal, that is, an address number of the receiving device 200. As the destination address of the response signal, the transmission source address of the control signal is copied and used. The transmission source address indicates a sending source of the response signal, that is, an address number of the transmitting device 100. As the transmission source address of the response signal, the destination address of the control signal is copied and used.

(c) Input Switching Processing

Figure 3:
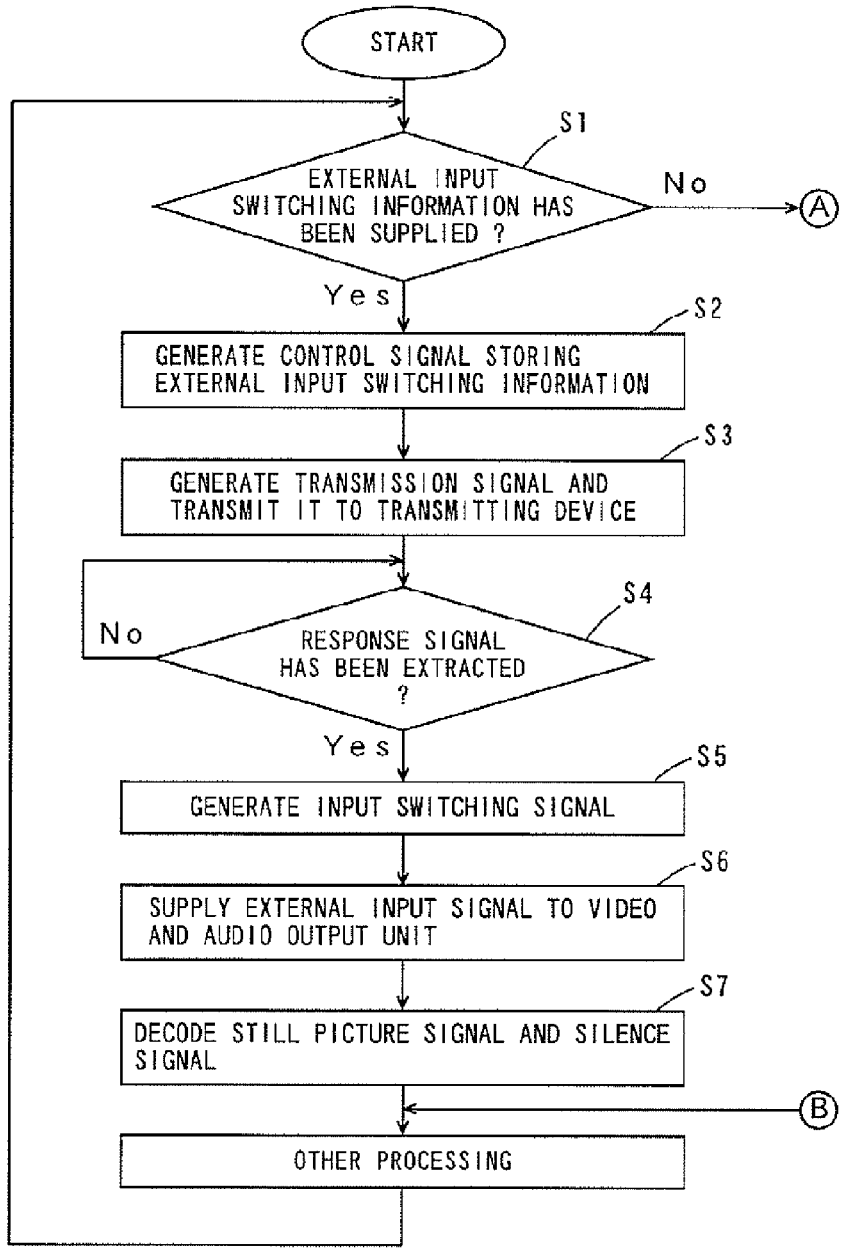
FIG. 3 is a flowchart showing input switching processing in a receiving device.
Figure 4:
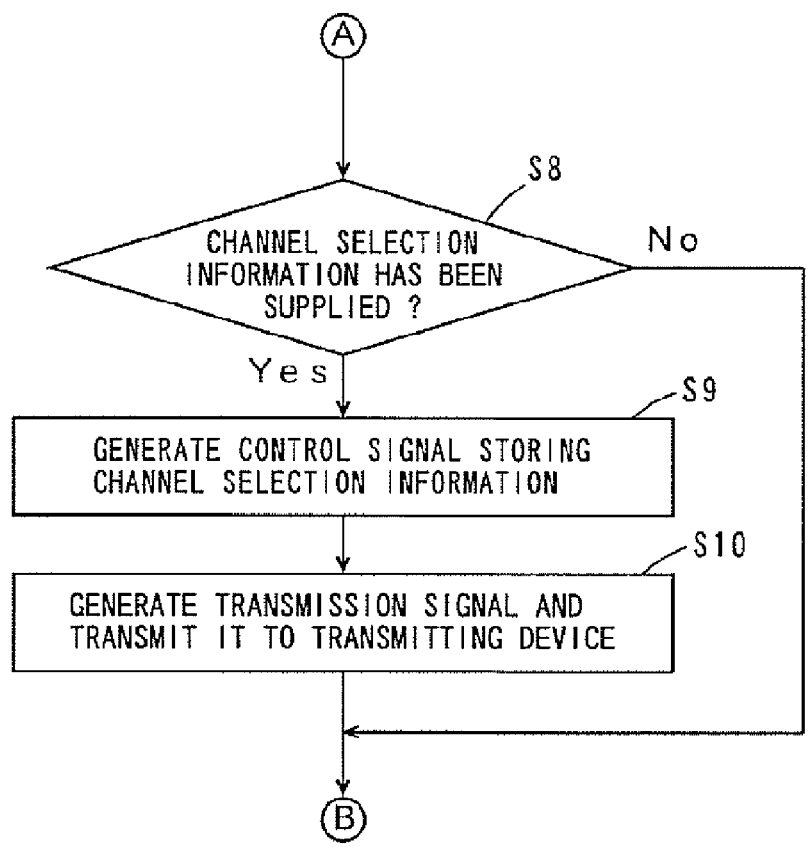
FIG. 4 is a flowchart showing the input switching processing in the receiving device.
Figure 5:
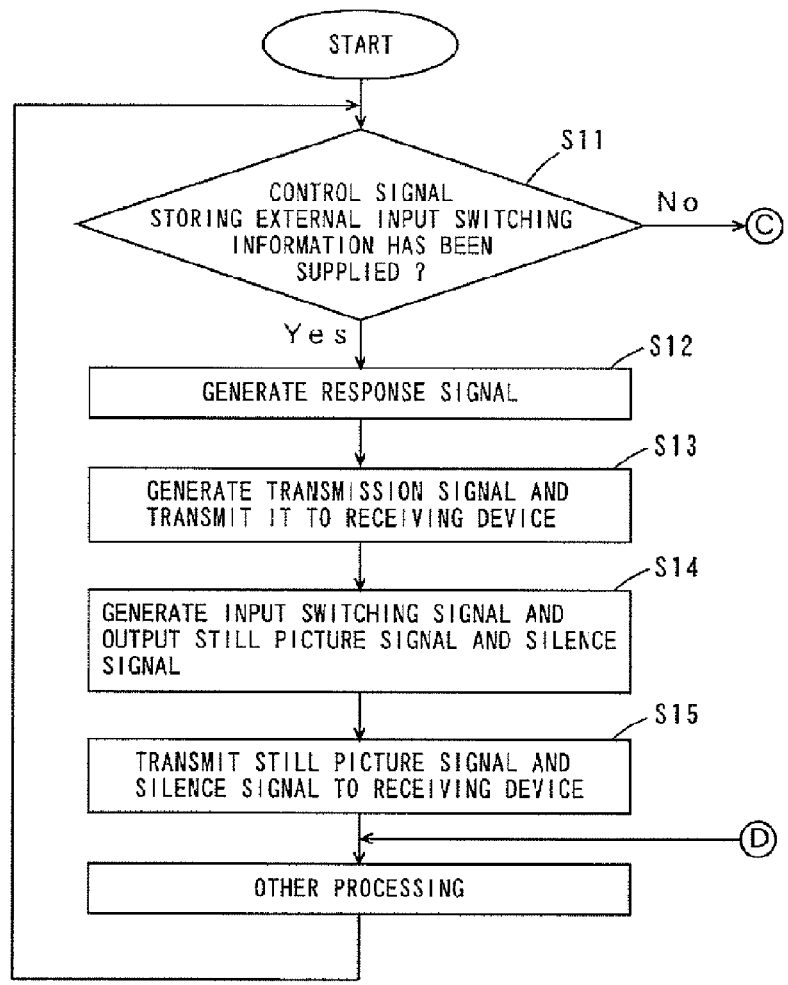
FIG. 5 is a flowchart showing input switching processing in a transmitting device.
Figure 6:
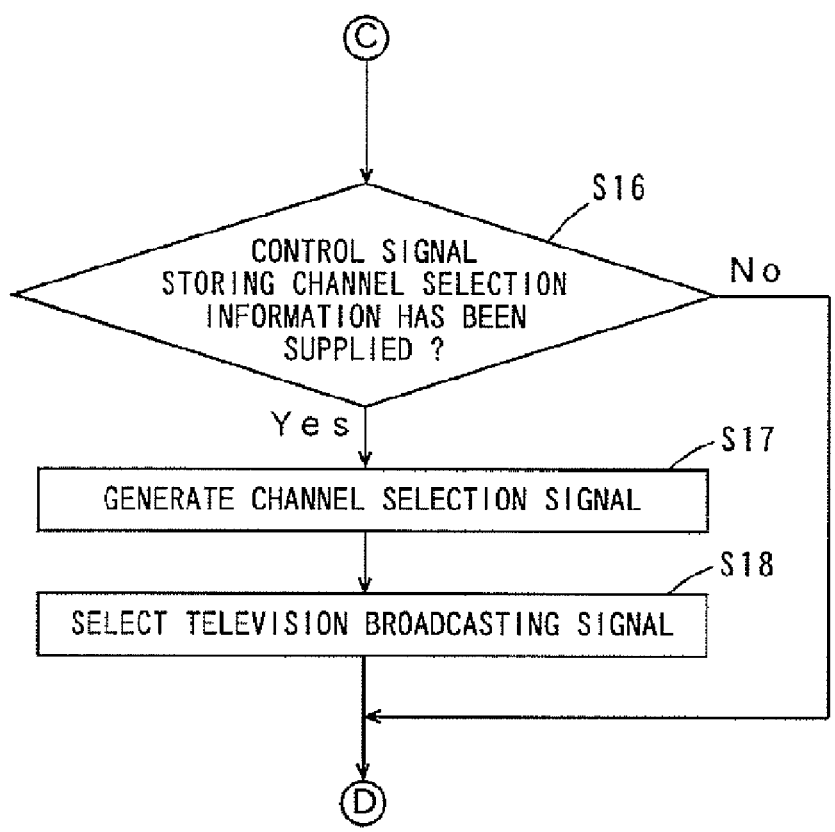
FIG. 6 is a flowchart showing the input switching processing in the transmitting device.

Next, the input switching processing in the communication system 1000 according to the present embodiment is described using the drawings. FIGS. 3 and 4 are flowcharts showing the input switching processing in the receiving device 200, and FIGS. 5 and 6 are flowcharts showing the input switching processing in the transmitting device 100. It is assumed that at the starting point of the input switching processing, the video signal and the audio signal based on the television broadcasting signal are being supplied to the video and audio output unit 205.

(c-1) Operation of Receiving Device

First, the input switching processing in the receiving device 200 is described.

As shown in FIG. 3, the controller 207 (refer to FIG. 1) determines whether or not the input switching information (hereinafter, referred to as external input switching information) for supplying the external input signal to the video and audio output unit 205 has been supplied from the input unit 206 (step S1). When the external input switching information has been supplied, the controller 207 generates the control signal storing the external input switching information (step S2).

Next, the transmission signal processor 208 generates the transmission signal based on the control signal generated by the controller 207, and the radio signal transceiver 201 transmits the transmission signal to the radio signal transceiver 106 of the transmitting device 100 as a radio signal (step S3).

Next, the controller 207 determines whether or not the response signal corresponding to the control signal generated in step S2 has been extracted by the reception signal processor 202 (step S4). When the response signal has not been extracted, the controller 207 stands by until the response signal is extracted.

In step S4, when the response signal has been extracted, the controller 207 generates the input switching signal (step S5).

Next, the input switch 204 supplies the external input signal to the video and audio output unit 205, based on the input switching signal generated in step S5 (step S6).

Next, the MPEG decoder 203 decodes the still picture signal and the silence signal transmitted from the transmitting device 100 (step S7).

Thereafter, the processing returns to step S1 through other processing.

In step S1, when the external input switching information has not been supplied, the controller 207, as shown in FIG. 4, determines whether or not the channel selection information has been supplied (step S8). When the channel selection information has been supplied, the controller 207 generates the control signal storing the channel selection information (step S9).

Next, the transmission signal processor 208 generates the transmission signal based on the control signal generated in step S9, and the radio signal transceiver 201 transmits the transmission signal to the radio signal transceiver 106 of the transmitting device 100 as a radio signal (step S10). This allows channel selection to be instructed in the transmitting device 100.

Thereafter, as shown FIG. 3, the processing returns to step S1 through other processing.

When the channel selection information has not been supplied in step S8 (refer to FIG. 4), the controller 207 returns to the processing in step S1 through other processing as shown in FIG. 3.

(c-2) Operation of Transmitting Device

Next, the input switching processing in the transmitting device 100 is described.

As shown in FIG. 5, the controller 110 (refer to FIG. 1) determines whether or not the control signal storing the external input switching information has been supplied from the reception signal processor 107 (step S11). When the control signal storing the external input switching information has been supplied, the controller 110 generates the response signal corresponding to the control signal (step S12).

Next, the transmission signal processor 105 generates the transmission signal based on the response signal generated by the controller 110, and the radio signal transceiver 106 transmits the transmission signal to the radio signal transceiver 201 of the receiving device 200 as a radio signal (step S13).

Next, the controller 110 generates the input switching signal, and based on the input switching signal, the input switch 103 outputs the still picture signal and the silence signal generated by the still picture generator 108 and the silence generator 109 (step S14).

Next, the controller 110 transmits the still picture signal and the silence signal outputted in step S14 to the receiving device 200 through the MPEG encoder 104, the transmission signal processor 105, and the radio signal transceiver 106 (step S15).

Thereafter, the processing returns to step S11 through other processing.

In step S11, when the control signal storing the external input switching information has not been supplied, the controller 110, as shown in FIG. 6, determines whether or not the control signal storing the channel selection information has been supplied (step S16). When the control signal storing the channel selection information has been supplied, the controller 110 generates the channel selection signal (step S17).

Next, the channel selector 101 selects the television broadcasting signal of a channel corresponding to the channel selection signal generated in step S17 (step S18). This allows the video signal and the audio signal based on the television broadcasting signal of the channel desired by the user to be supplied to the video and audio output unit 205 of the receiving device 200 (refer to FIG. 1).

In step S16 (refer to FIG. 6), when the control signal storing the channel selection information has not been supplied, the controller 110 returns to the processing in step S11, as shown in FIG. 5.

(d) Effects

As described above, in the communication system 1000 according to the present embodiment, when the external input signal is supplied to the video and audio output unit 205, the still picture signal and the silence signal are transmitted from the transmitting device 100 to the receiving device 200. In this case, the data communication amount between the transmitting device 100 and the receiving device 200 is largely reduced, which can sufficiently reduce power consumption.

Furthermore, the response signal is transmitted from the transmitting device 100 in response to the control signal transmitted from the receiving device 200. In this case, the controller 207 of the receiving device 200 can surely recognize a communication state between the transmitting device 100 and the receiving device 200, and the state can be displayed on the display device or the like. This allows the user to arrange the transmitting device 100 and the receiving device 200 so that the communication state between the transmitting device 100 and the receiving device 200 is improved.

While the processing in steps S5 and S6 is performed after the response signal is supplied to the controller 207 in the above-described embodiment as shown in FIG. 3, the processing in step S4 may be performed after the processing in steps S5 and S6 is performed.

Moreover, the processing in step S4 may not be provided. That is, even if the response signal has not been extracted in step S4, the processing in steps S5 to S7 may be performed.

(2) Second Embodiment (a) Configuration of Communication System

Figure 7:
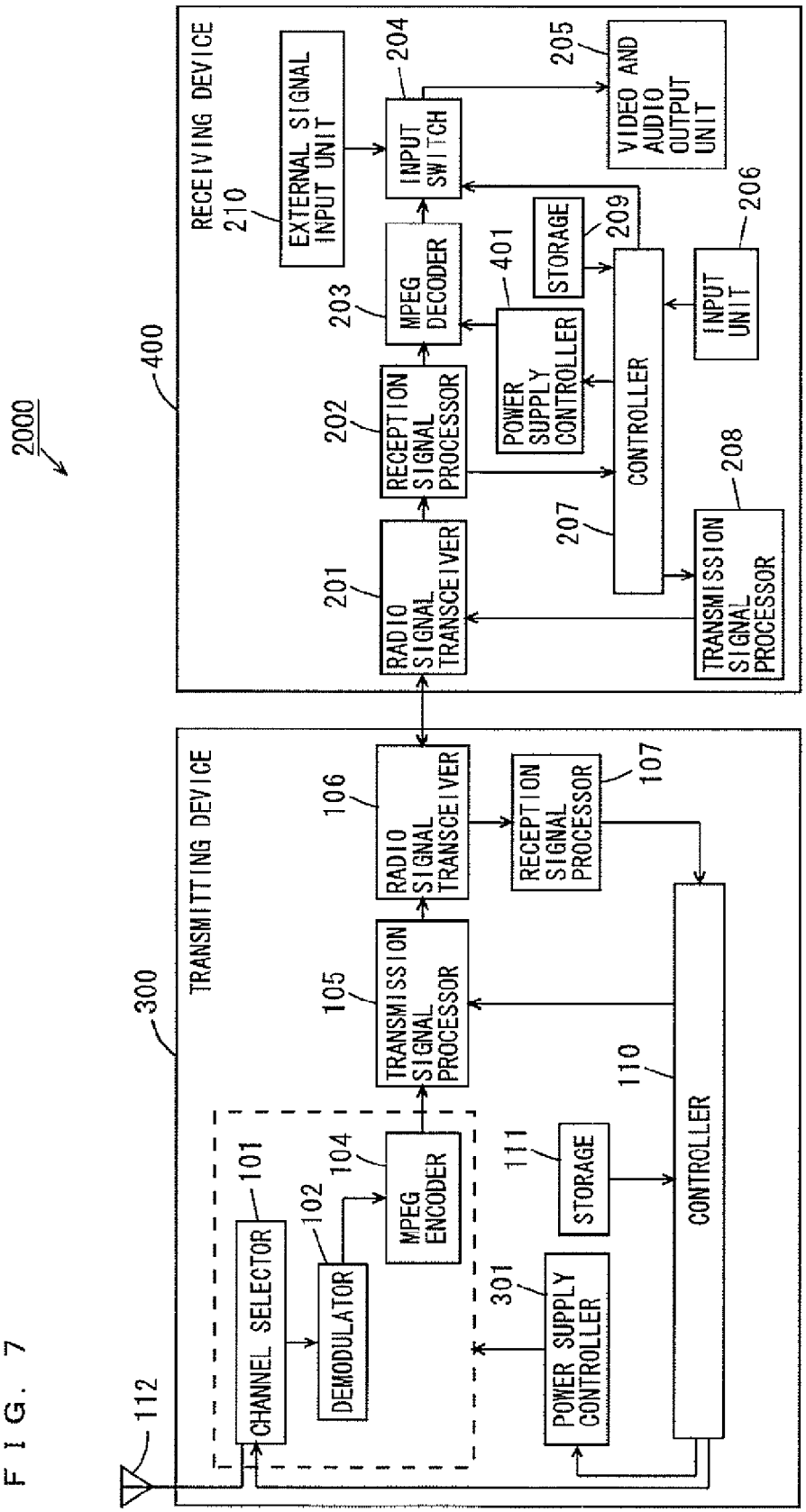
FIG. 7 is a block diagram showing a configuration of a communication system according to a second embodiment of the present invention.

FIG. 7 is a block diagram showing a configuration of a communication system according to a second embodiment of the present invention. Different points of the communication system according to the present embodiment from the communication system 1000 of FIG. 1 are as follows.

As shown in FIG. 7, a communication system 2000 according to the present embodiment is composed of a transmitting device 300 and a receiving device 400.

The transmitting device 300 includes the channel selector 101, the demodulator 102, the MPEG encoder 104, the transmission signal processor 105, the radio signal transceiver 106, the reception signal processor 107, the controller 110, the storage 111, and a power supply controller 301.

The receiving device 400 includes the radio signal transceiver 201, the reception signal processor 202, the MPEG decoder 203, the input switch 204, the video and audio output unit 205, the input unit 206, the controller 207, the transmission signal processor 208, the storage 209, the external signal input unit 210, and a power supply controller 401.

In the present embodiment, the MPEG encoder 104 of the transmitting device 300 compression-encodes the video signal and the audio signal demodulated by the demodulator 102 in an MPEG method.

The controller 110 generates the response signal, a power supply control signal, and the channel selection signal, based on the control signal extracted by the reception signal processor 107.

The power supply controller 301 controls the power supply to the channel selector 101, the demodulator 102 and the MPEG encoder 104, based on the power supply control signal generated by the controller 110.

The controller 207 of the receiving device 400 generates the control signal based on the input switching information or the channel selection information supplied from the input unit 206, and information of the transmitting device 300, which is stored in the storage 209. Also, the controller 207 generates the input switching signal and the power supply control signal based on the above-mentioned input switching information.

The power supply controller 401 controls the power supply to the MPEG decoder 203 based on the power supply control signal generated by the controller 207.

In the present embodiment, in the field F5 of the control signal shown in FIG. 2A, the channel selection information or power supply control information is stored as the control information.

(b) Input Switching Processing

Figure 8:
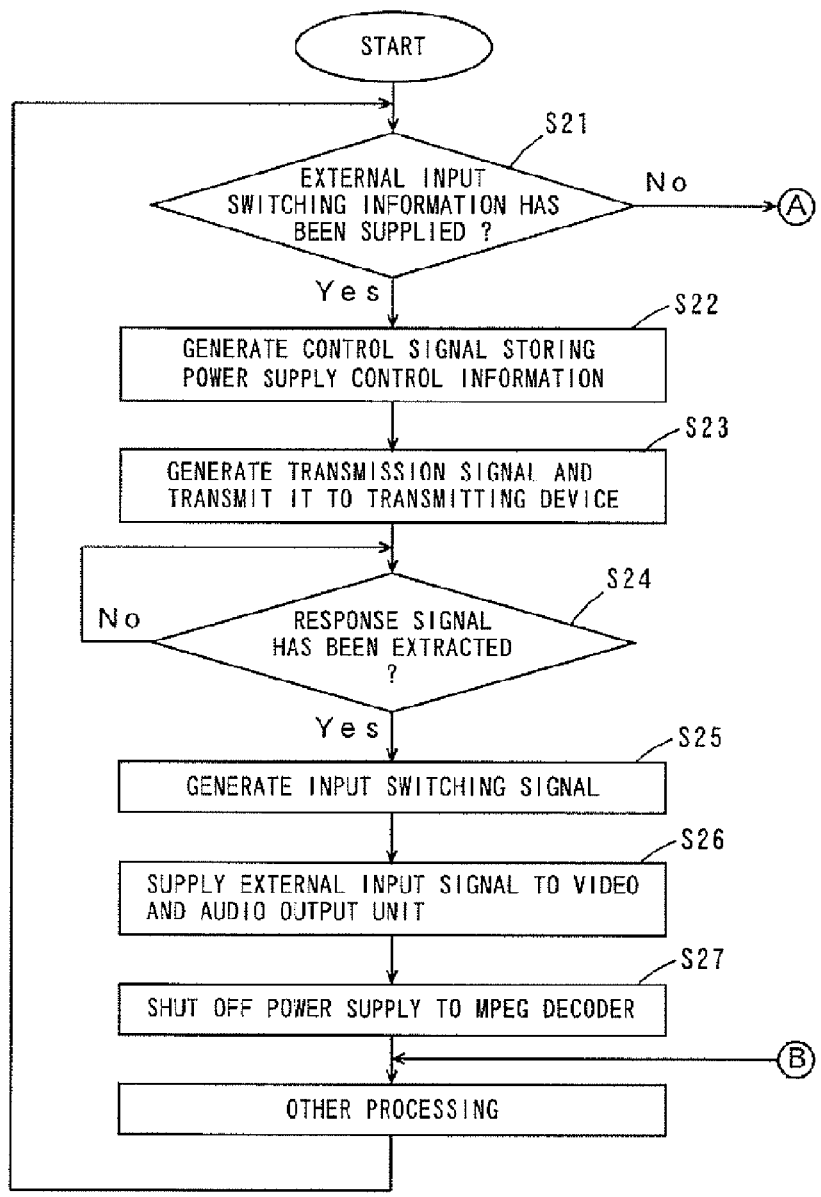
FIG. 8 is a flowchart showing input switching processing in a receiving device.
Figure 9:
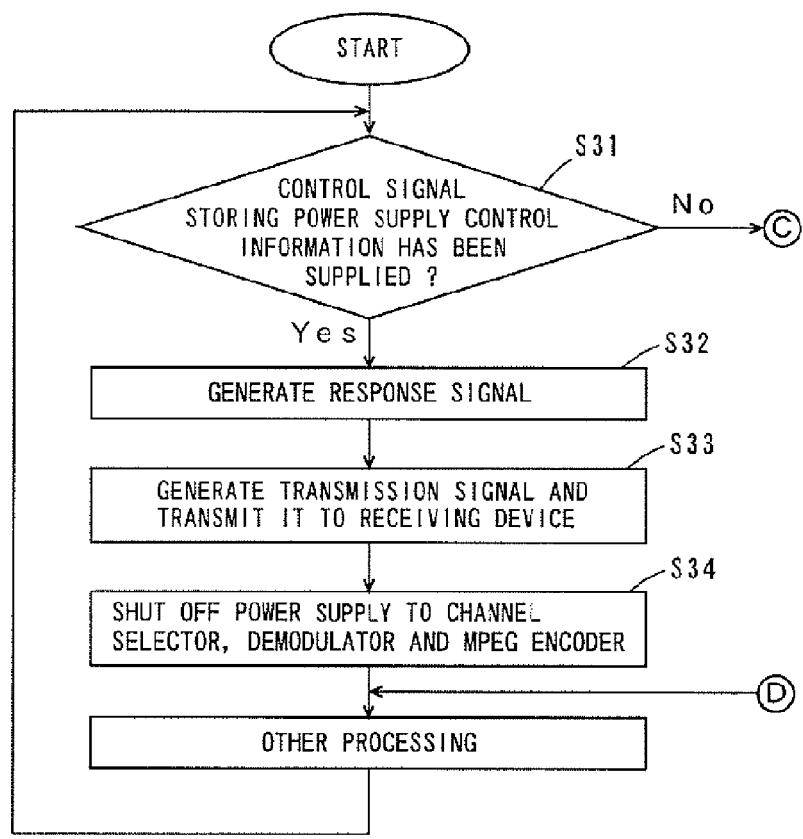
FIG. 9 is a flowchart showing input switching processing in a transmitting device.

Next, input switching processing in the communication system 2000 according to the present embodiment is described using the drawings. FIG. 8 is a flowchart showing the input switching processing in the receiving device 400, and FIG. 9 is a flowchart showing the input switching processing in the transmitting device 300. It is assumed that at the starting point of the input switching processing, the video signal and the audio signal based on the television broadcasting signal are being supplied from the video and audio output unit 205.

(b-1) Operation of Receiving Device

First, the input switching processing in the receiving device 400 is described.

As shown in FIG. 8, the controller 207 (refer to FIG. 7) determines whether or not the external input switching information has been supplied from the input unit 206 (step S21). When the external input switching information has been supplied, the controller 207 generates the control signal storing the power supply control information (step S22).

Next, the transmission signal processor 208 generates the transmission signal based on the control signal generated by the controller 207, and the radio signal transceiver 201 transmits the transmission signal to the radio signal transceiver 106 of the transmitting device 300 as a radio signal (step S23).

Next, the controller 207 determines whether or not the response signal corresponding to the control signal generated in step S22 has been extracted by the reception signal processor 202 (step S24). When the response signal has not been extracted, the controller 207 stands by until the response signal is extracted.

In step S24, when the response signal has been extracted, the controller 207 generates the input switching signal (step S25).

Next, the input switch 204 supplies the external input signal to the video and audio output unit 205, based on the input switching information generated in step S25 (step S26).

Next, the controller 207 generates the power supply control signal, and based on the power supply control signal, the power supply controller 401 shuts off the power supply to the MPEG decoder 203 (step S27).

Thereafter, the processing returns to step S21 through other processing.

In step S21, when the external input switching information has not been supplied, the processing in steps S8 to S10 described in FIG. 4 is performed. Thereafter, as shown in FIG. 8, the processing returns to step S21 through other processing.

(b-2) Operation of Transmitting Device

Next, the input switching processing in the transmitting device 300 is described.

As shown in FIG. 9, the controller 110 (refer to FIG. 7) determines whether or not the control signal storing the power supply control signal has been supplied from the reception signal processor 107 (step S31). When the control signal storing the power supply control signal has been supplied, the controller 110 generates the response signal corresponding to the control signal (step S32).

Next, the transmission signal processor 105 generates a transmission signal based on the response signal generated by the controller 110, and the radio signal transceiver 106 transmits the transmission signal to the radio signal transceiver 201 of the receiving device 400 as a radio signal (step S33).

Next, the controller 110 generates the power supply control signal, and based on the power supply control signal, the power supply controller 301 shuts off the power supply to the channel selector 101, the demodulator 102, and the MPEG encoder 104 (step S34).

Thereafter, the processing returns to step S31 through other processing.

In step S31, when the control signal storing the power supply control information has not been supplied, the processing in steps S16 to S18 described in FIG. 6 is performed. Thereafter, as shown in FIG. 9, the processing returns to step S31 through other processing.

(c) Effects

As described above, in the communication system 2000 according to the present embodiment, when the external input signal has been supplied to the video and audio output unit 205, the power supply to the channel selector 101, the demodulator 102, and the MPEG encoder 104 of the transmitting device 300, and the MPEG decoder 203 of the receiving device 400 are shut off. This can sufficiently reduce power consumption of the transmitting device 300 and the receiving device 400.

Moreover, since data communication is not performed between the transmitting device 300 and the receiving device 400, the power consumption of the transmitting device 300 and the receiving device 400 can be further reduced.

Furthermore, the response signal is transmitted from the transmitting device 300 in response to the control signal transmitted from the receiving device 400. In this case, the controller 207 of the receiving device 400 can surely recognize a communication state between the transmitting device 300 and the receiving device 400, and the state can be displayed on the display device or the like. This allows the user to arrange the transmitting device 300 and the receiving device 400 so that the communication state between the transmitting device 300 and the receiving device 400 is improved.

While the processing in steps S25 and S26 is performed after the response signal is supplied to the controller 207 in the above-described embodiment as shown in FIG. 8, the processing in step S24 may be performed after the processing in steps S25 and S26 is performed.

Moreover, the processing in step S24 may not be provided. That is, even if the response signal is not extracted in step S24, the processing in steps S25 to S27 may be performed.

(3) Third Embodiment (a) Configuration of Communication System

Figure 10:
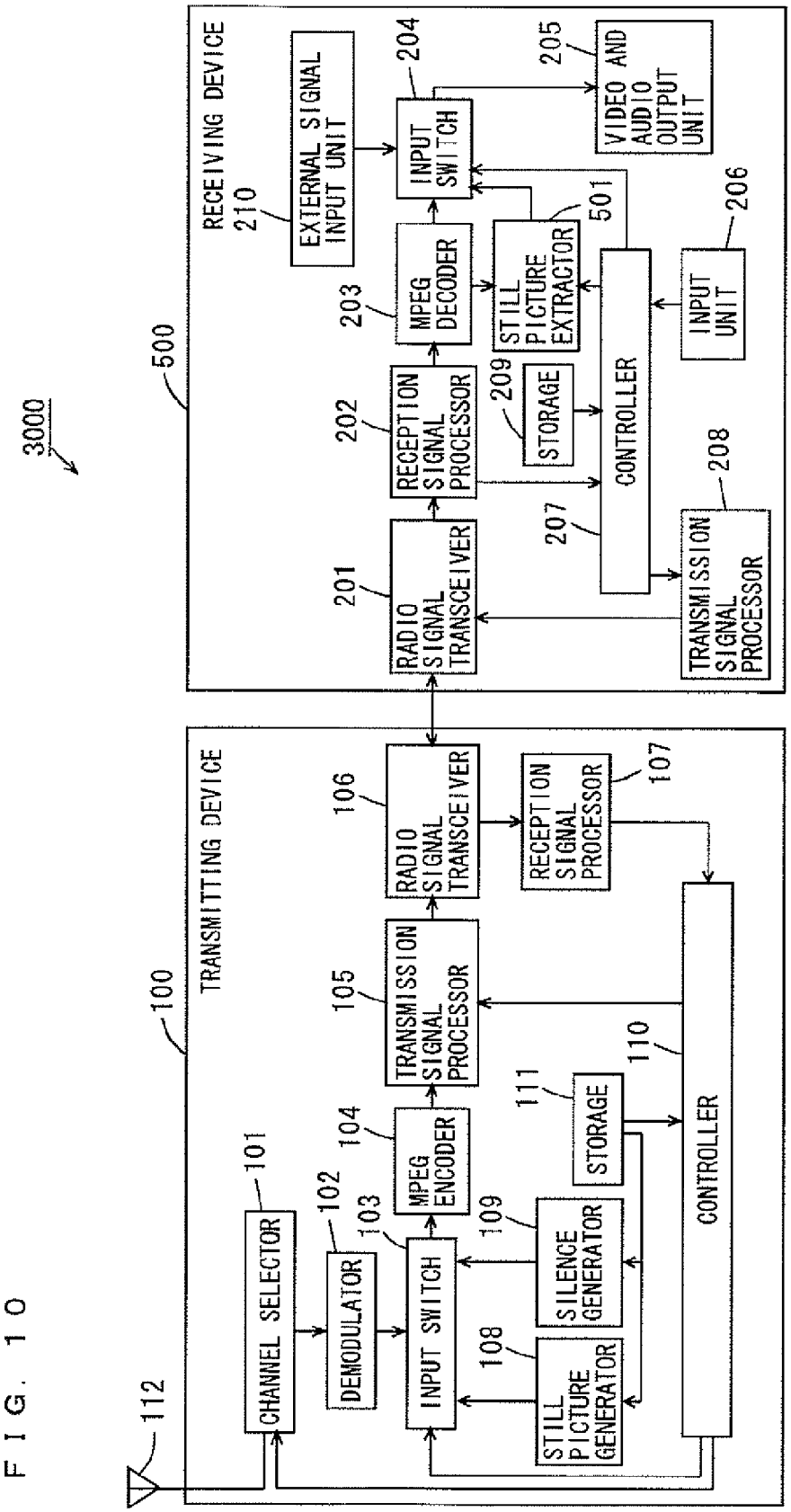
FIG. 10 is a block diagram showing a configuration of a communication system according to a third embodiment of the present invention.

FIG. 10 is a block diagram showing a configuration of a communication system according to a third embodiment of the present invention. Different points of the communication system according to the present embodiment from the communication system 1000 of FIG. 1 are as follows.

As shown in FIG. 10, the communication system 3000 according to the present embodiment is composed of the transmitting device 100 and a receiving device 500.

The receiving device 500 includes the radio signal transceiver 201, the reception signal processor 202, the MPEG decoder 203, the input switch 204, the video and audio output unit 205, the input unit 206, the controller 207, the transmission signal processor 208, the storage 209, the external signal input unit 210, and a still picture extractor 501.

In the present embodiment, the controller 207 of the receiving device 500 generates the control signal based on the input switching information or the channel selection information supplied from the input unit 206, and the information of the transmitting device 100 stored in the storage 209. Also, the controller 207 generates the input switching signal, a still picture extracting signal, and a still picture sending signal, based on the above-mentioned input switching information.

The still picture extractor 501 extracts the still picture signal from the MPEG decoder 203, based on the still picture extracting signal generated by the controller 207, and stores the still picture signal. Also, the still picture extractor 501 supplies the above-mentioned stored still picture signal to the input switch 204 based on the still picture sending signal generated by the controller 207.

The input switch 204, based on the input switching signal generated by the controller 207, supplies the video and audio output unit 205 the video signal and the audio signal decoded by the MPEG decoder 203, the video signal and the audio signal supplied from the external signal input unit 210 (external input signal), or the still picture signal supplied from the still picture extractor 501.

(b) Input Switching Processing

Figure 11:
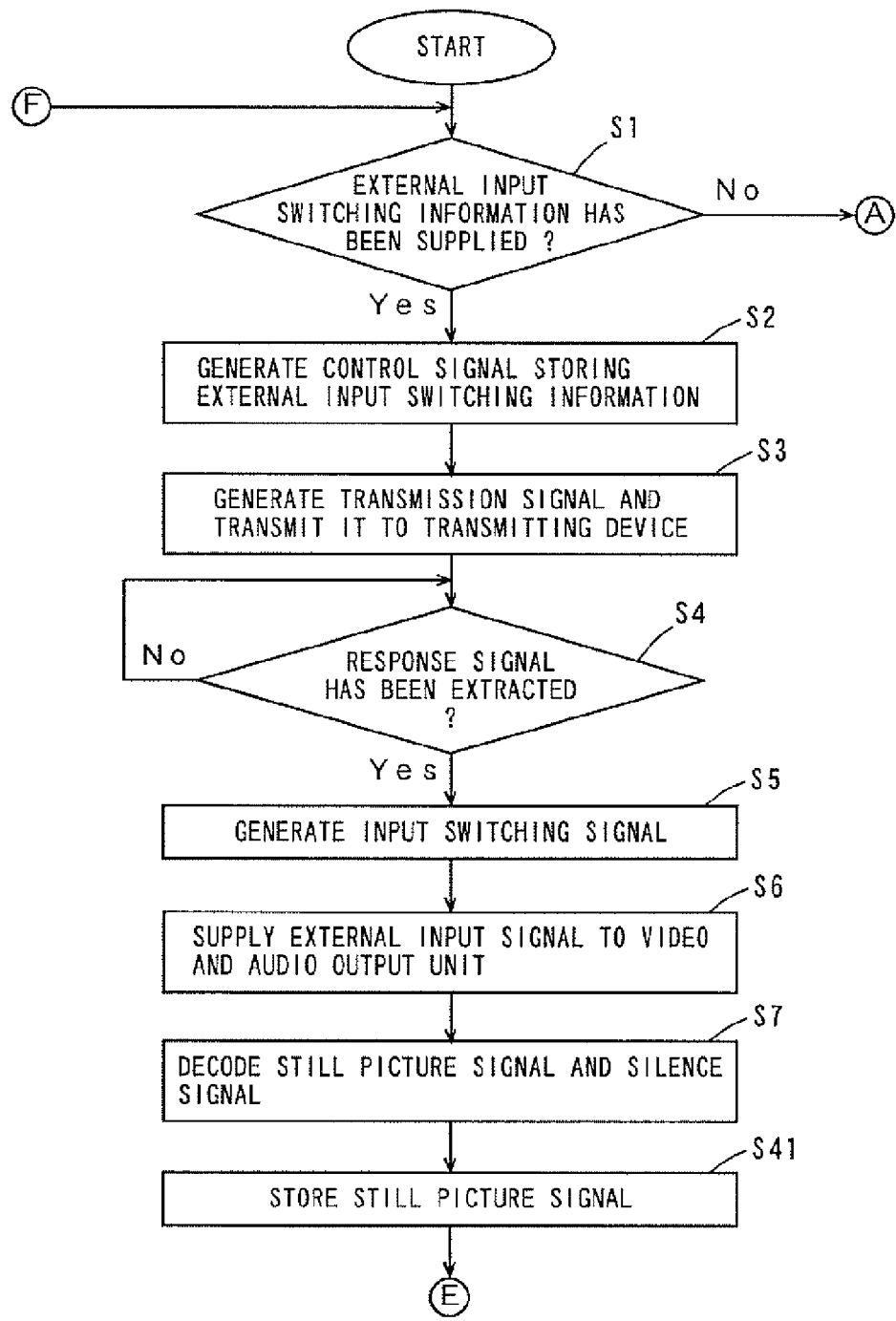
FIG. 11 is a flowchart showing input switching processing in a receiving device.
Figure 12:
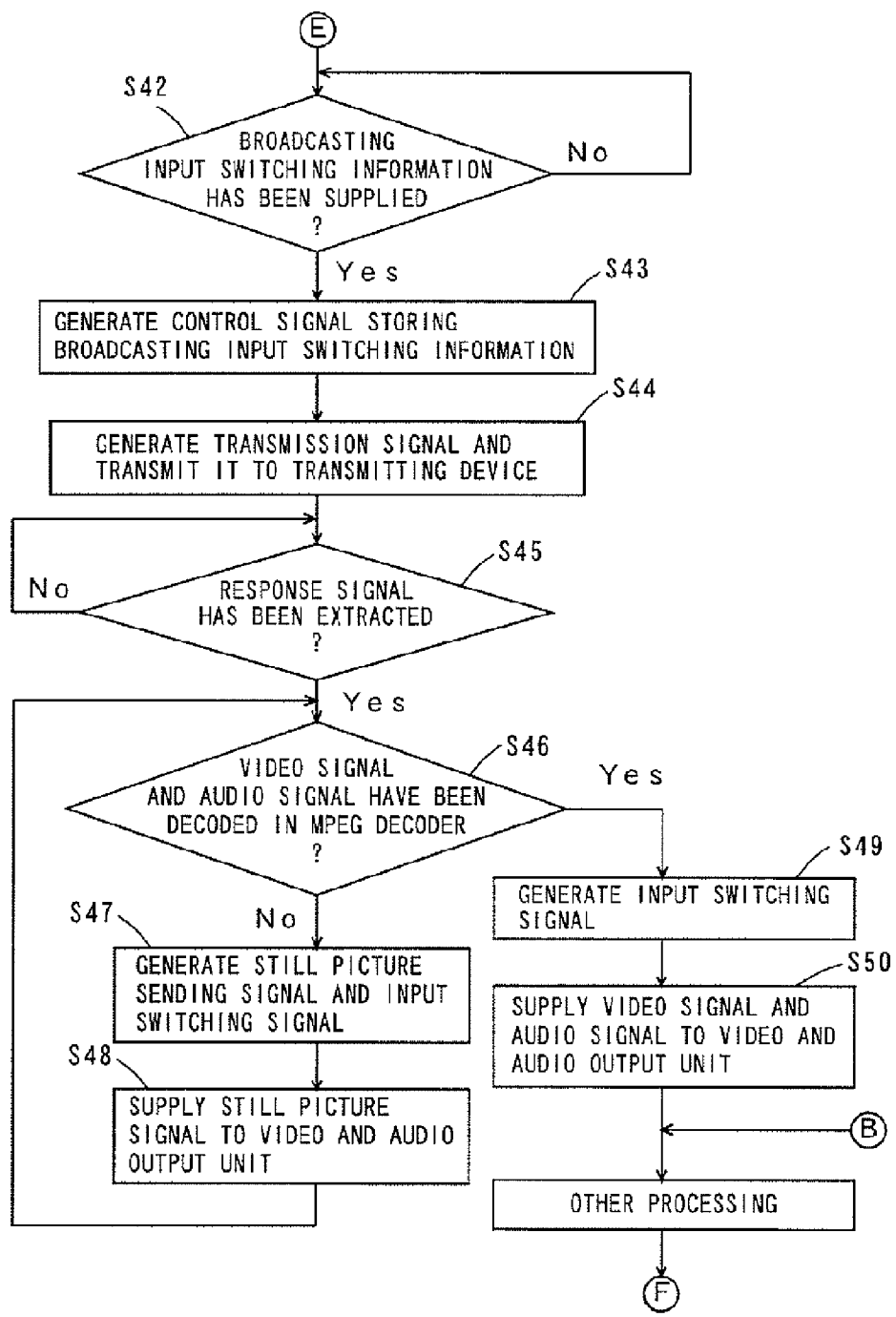
FIG. 12 is a flowchart showing the input switching processing in the receiving device.
Figure 13:
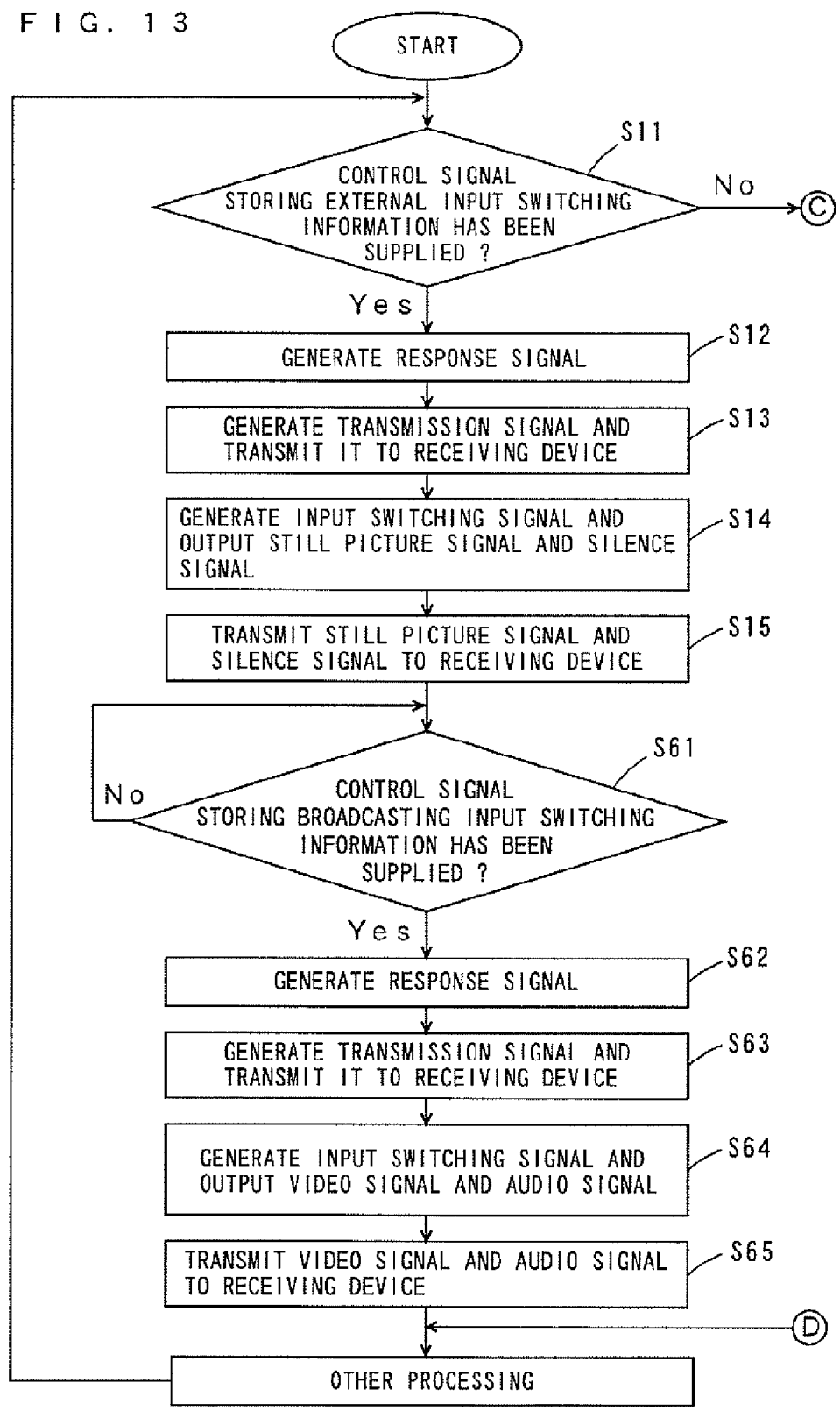
FIG. 13 is a flowchart showing input switching processing in a transmitting device.

Next, input switching processing in the communication system 3000 according to the present embodiment is described using the drawings. FIGS. 11 and 12 are flowcharts showing the input switching processing in the receiving device 500, and FIG. 13 is a flowchart showing the input switching processing in the transmitting device 100.

(b-1) Operation of Receiving Device

First, the input switching processing in the receiving device 500 is described.

As shown in FIG. 11, in the receiving device 500, processing similar to that in steps S1 to S7 described in FIG. 3 is first performed. Subsequently, the controller 207 generates the still picture extracting signal, and based on the still picture extracting signal, the still picture extractor 501 extracts the still picture signal from the MPEG decoder 203, and stores the still picture signal (step S41).

Next, as shown in FIG. 12, the controller 207 determines whether or not the input switching information (hereinafter, referred to as broadcasting input switching information) for supplying the output signal of the MPEG decoder 203 to the video and audio output unit 205 has been supplied from the input unit 206 (step S42). When the broadcasting input switching information has been supplied, the controller 207 generates the control signal storing the broadcasting input switching information (step S43).

Next, the transmission signal processor 208 generates the transmission signal based on the control signal generated by the controller 207, and the radio signal transceiver 201 transmits the transmission signal to the radio signal transceiver 106 of the transmitting device 100 as a radio signal (step S44).

Next, the controller 207 determines whether or not the response signal corresponding to the control signal generated in step S43 has been extracted by the reception signal processor 202 (step S45). When the response signal has not been extracted, the controller 207 stands by until the response signal is extracted.

In step S45, when the response signal has been extracted, the controller 207 determines whether or not the video signal and the audio signal have been decoded in the MPEG decoder 203 (step S46). When the video signal and the audio signal have not been decoded, the controller 207 generates the still picture sending signal and the input switching signal (step S47). In step S47, the input switching signal for supplying the still picture signal of the still picture extractor 501 to the video and audio output unit 205 is generated.

Next, based on the still picture sending signal and the input switching signal generated in step S47, the still picture extractor 501 supplies the still picture signal to the input switch 204, and the input switch 204 supplies the still picture signal to the video and audio output unit 205 (step S48). Thereafter, the processing returns to step S46.

In step S46, when the video signal and the audio signal have been decoded in the MPEG decoder 203, the controller 207 generates the input switching signal (step S49). In step 49, the input switching signal for supplying the video signal and the audio signal decoded by the MPEG decoder 203 to the video and audio output unit 205 is generated.

Next, based on the input switching signal generated in step S49, the input switch 204 supplies the video signal and the audio signal decoded by the MPEG decoder 203 to the video and audio output unit 205 (step S50). Thereafter, the processing returns to step S1 of FIG. 11 through other processing.

In step S1 of FIG. 11, when the external input switching information has not been supplied, the processing in steps S8 to S10 described in FIG. 4 is performed. Thereafter, the processing returns to step S1 of FIG. 11 through other processing as shown in FIG. 12.

(b-2) Operation of Transmitting Device

Next, the input switching processing in the transmitting device 100 is described.

As shown in FIG. 13, in the transmitting device 100, processing similar to that in steps S11 to S15 described in FIG. 5 is first performed.

Next, the controller 110 determines whether or not the control signal storing the broadcasting input switching information has been supplied from the reception signal processor 107 (step S61). When the control signal storing the broadcasting input switching information has been supplied, the controller 110 generates the response signal corresponding to the control signal (step S62).

Next, the transmission signal processor 105 generates the transmission signal based on the response signal generated in step S62, and the radio signal transceiver 106 transmits the transmission signal to the radio signal transceiver 201 of the receiving device 500 as a radio signal (step S63).

Next, the controller 110 generates the input switching signal, and based on the input switching signal, the input switch 103 outputs the video signal and the audio signal demodulated by the demodulator 102 (step S64).

Next, the controller 110 transmits the video signal and the audio signal outputted in step S64 to the receiving device 500 through the MPEG encoder 104, the transmission signal processor 105, and the radio signal transceiver 106 (step S65).

Thereafter, the processing returns to step S11 of FIG. 13 through other processing.

In step S11, when the control signal storing the external input switching information has not been supplied, the processing in steps S16 to S18 described in FIG. 6 is performed. Thereafter, as shown in FIG. 13, the processing returns to step S11 through other processing.

(c) Effects

As described above, in the communication system 3000 according to the present embodiment, similar to the communication system 1000 of FIG. 1, when the external input signal has been supplied to the video and audio output unit 205, the still picture signal and the silence signal are transmitted from the transmitting device 100 to the receiving device 500. This can largely reduce the data communication amount between the transmitting device 100 and the receiving device 500, which can sufficiently reduce power consumption.

Furthermore, the still picture extractor 501 is provided in the receiving device 500. Here, in the present embodiment, when the external input signal supplied to the video and audio output unit 205 is switched to the video signal and the audio signal based on the television broadcasting signal, the output signal of the input switch 103 is switched from the still picture signal and the silence signal to the video signal and the audio signal in the transmitting device 100. At this time, the data amount of the video signal is larger than that of the still picture signal, and the time required for data compression is longer. Therefore, after the output signal of the input switch 103 is switched to the video signal, a predetermined time is required for supplying the video signal to the input switch 204 of the receiving device 500.

Thus, when the external input signal supplied to the video and audio output unit 205 is directly switched to the output signal of the MPEG decoder 203 in the input switch 204 of the receiving device 500, a period of time when the video signal is not supplied to the video and audio output unit 205 occurs. In this case, since no image is displayed on the video and audio output unit 205, the viewer becomes anxious about whether or not the communication system 3000 is normally operating for a moment.

Consequently, according to the present embodiment, when the external input signal supplied to the video and audio output unit 205 is switched to the video signal and the audio signal based on the television broadcasting signal, if the video signal and the audio signal have not been decoded in the MPEG decoder 203, the still picture signal of the still picture extractor 501 is supplied to the video and audio output unit 205. This allows a still image to be displayed on the video and audio output unit 205, which can prevent the period of time when no image is displayed on the video and audio output unit 205 from occurring. As a result, the viewer can recognize the fact that the communication system 3000 is operating normally.

While the processing in steps S46 to S50 is performed after the response signal is supplied to the controller 207 in the above-described embodiment as shown in FIG. 12, the processing in step S45 may not be provided. That is, even if the response signal is not supplied to the controller 207 in step S45, the processing in steps S46 to S50 may be performed.

(4) Fourth Embodiment (a) Configuration of Communication System

Figure 14:
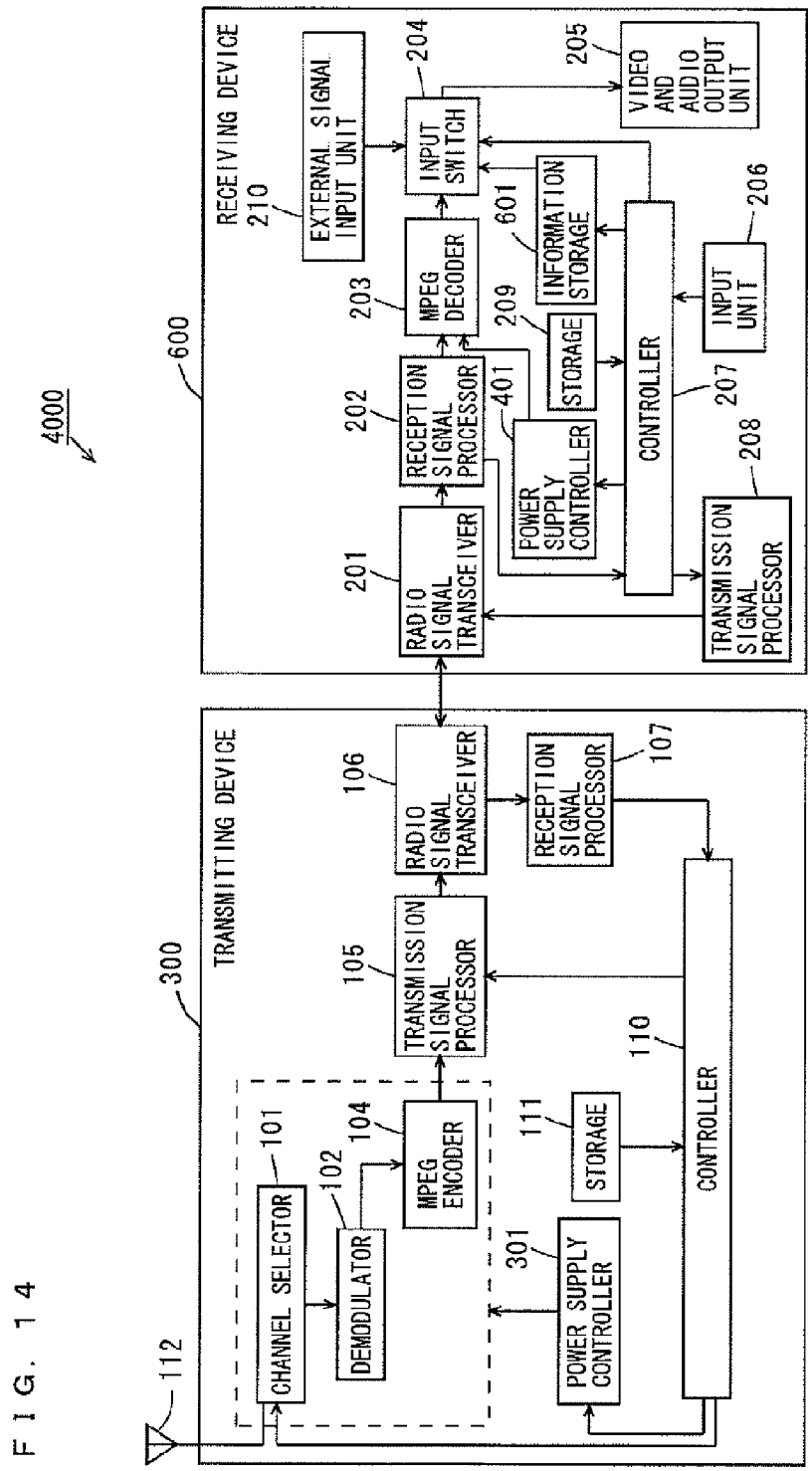
FIG. 14 is a block diagram showing a configuration of a communication system according to a fourth embodiment of the present invention.

FIG. 14 is a block diagram showing a configuration of a communication system according to a fourth embodiment of the present invention. Different points of the communication system according to the present embodiment from the communication system 2000 of FIG. 7 are as follows.

As shown in FIG. 14, a communication system 4000 according to the present embodiment is composed of the transmitting device 300 and a receiving device 600.

The receiving device 600 includes the radio signal transceiver 201, the reception signal processor 202, the MPEG decoder 203, the input switch 204, the video and audio output unit 205, the input unit 206, the controller 207, the transmission signal processor 208, the storage 209, the external signal input unit 210, and the power supply controller 401 and an information storage 601.

In the present embodiment, the controller 207 of the receiving device 600 generates the control signal based on the input switching information or the channel selection information supplied from the input unit 206, and the information of the transmitting device 300 stored in the storage 209. Also, the controller 207 generates the input switching signal and an information sending signal based on the above-mentioned input switching information.

The information storage 601 stores predetermined information, and supplies the predetermined stored information to the input switch 204 as an information signal, based on the information sending signal generated by the controller 207. In the information storage 601, for example, a photograph of the user's family may be stored, program information of the television broadcasting signal and the like may be stored, or character information for displaying that the input switching processing is on progress may be stored.

The input switch 204 supplies the video signal and the audio signal decoded by the MPEG decoder 203, the video signal and the audio signal supplied from the external signal input unit 210 (external input signal), or the information signal supplied from the information storage 601 to the video and audio output unit 205, based on the input switching information generated by the controller 207.

(b) Input Switching Processing

Figure 15:
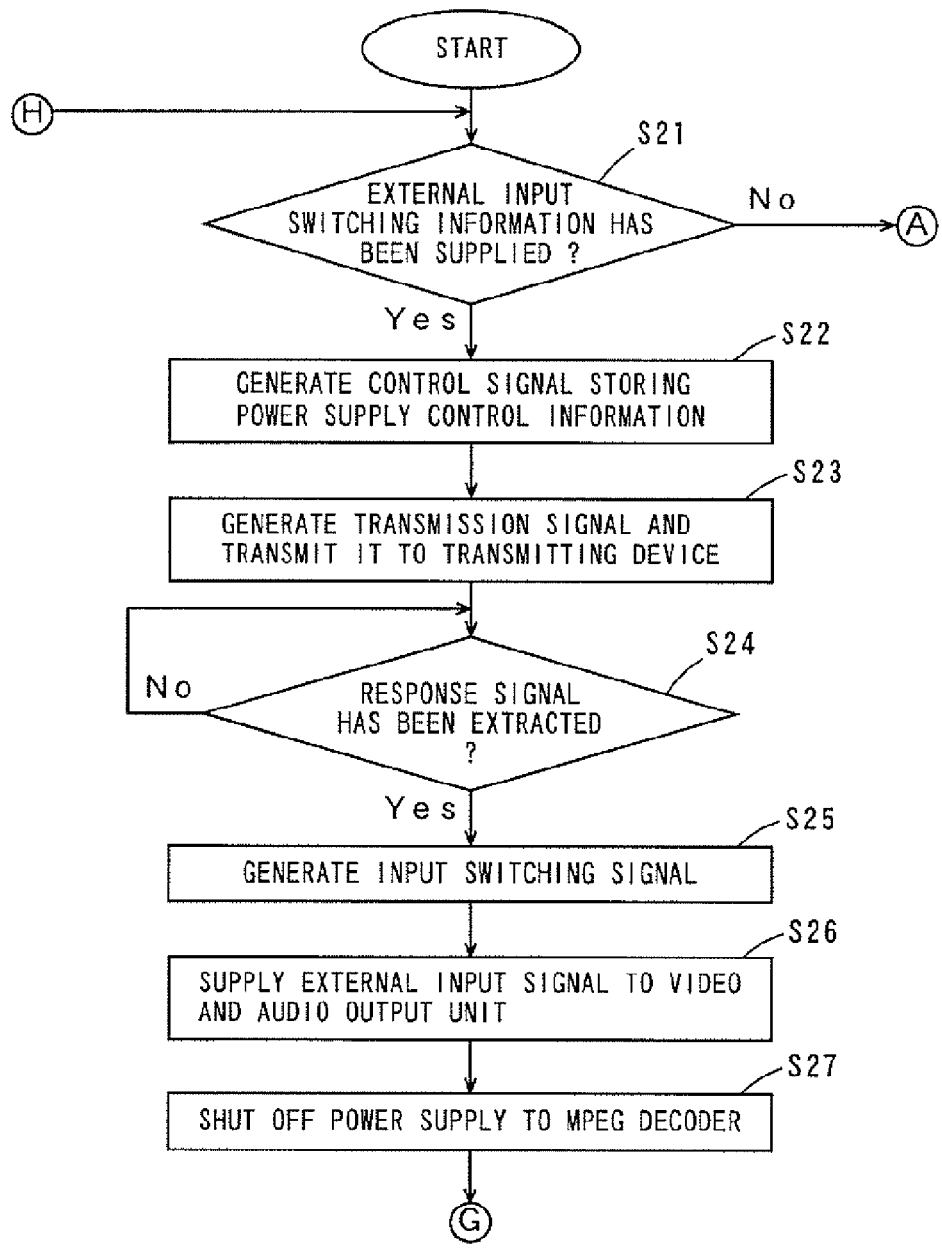
FIG. 15 is a flowchart showing input switching processing in a receiving device.
Figure 16:
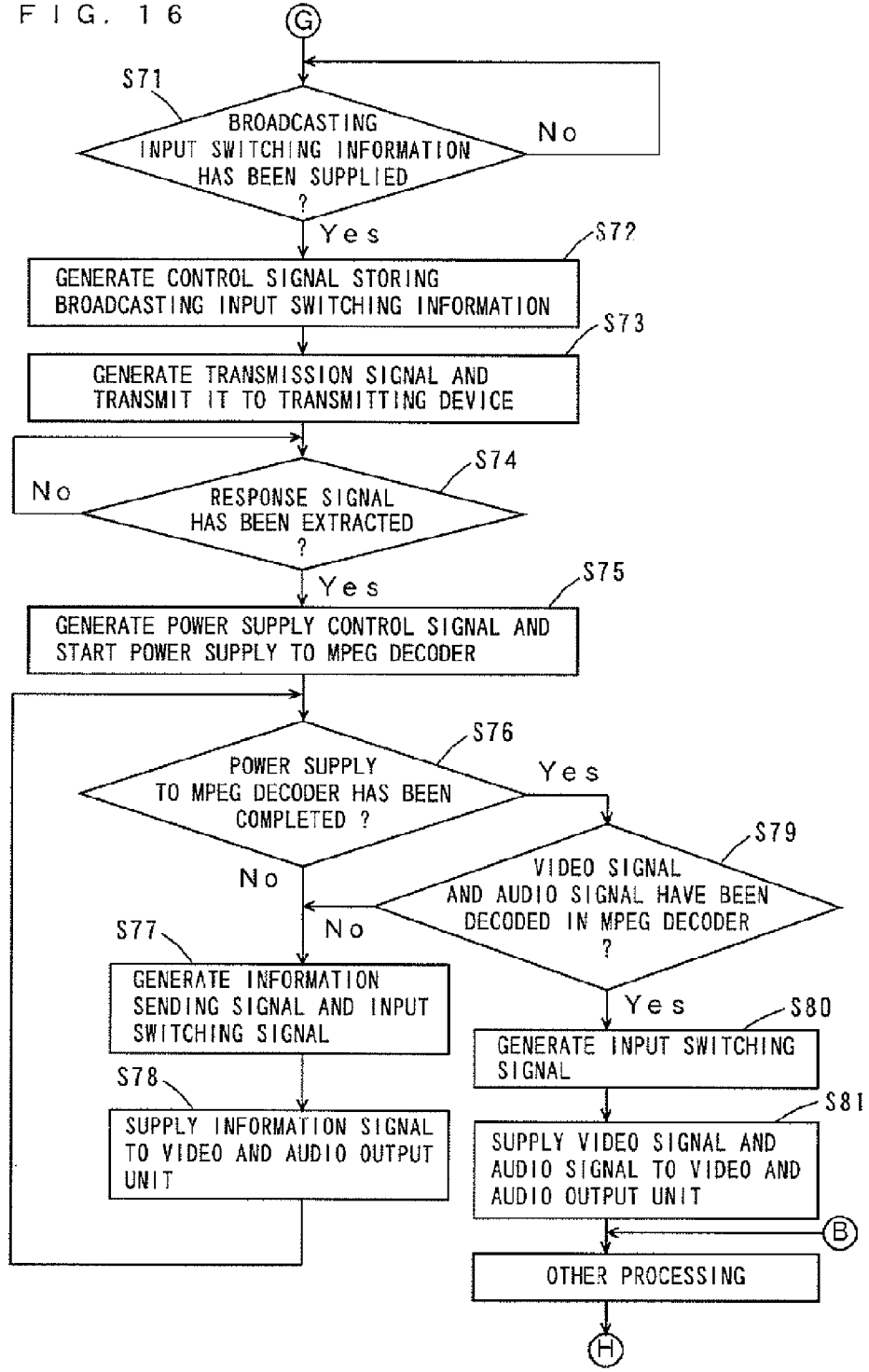
FIG. 16 is a flowchart showing the input switching processing in the receiving device.
Figure 17:
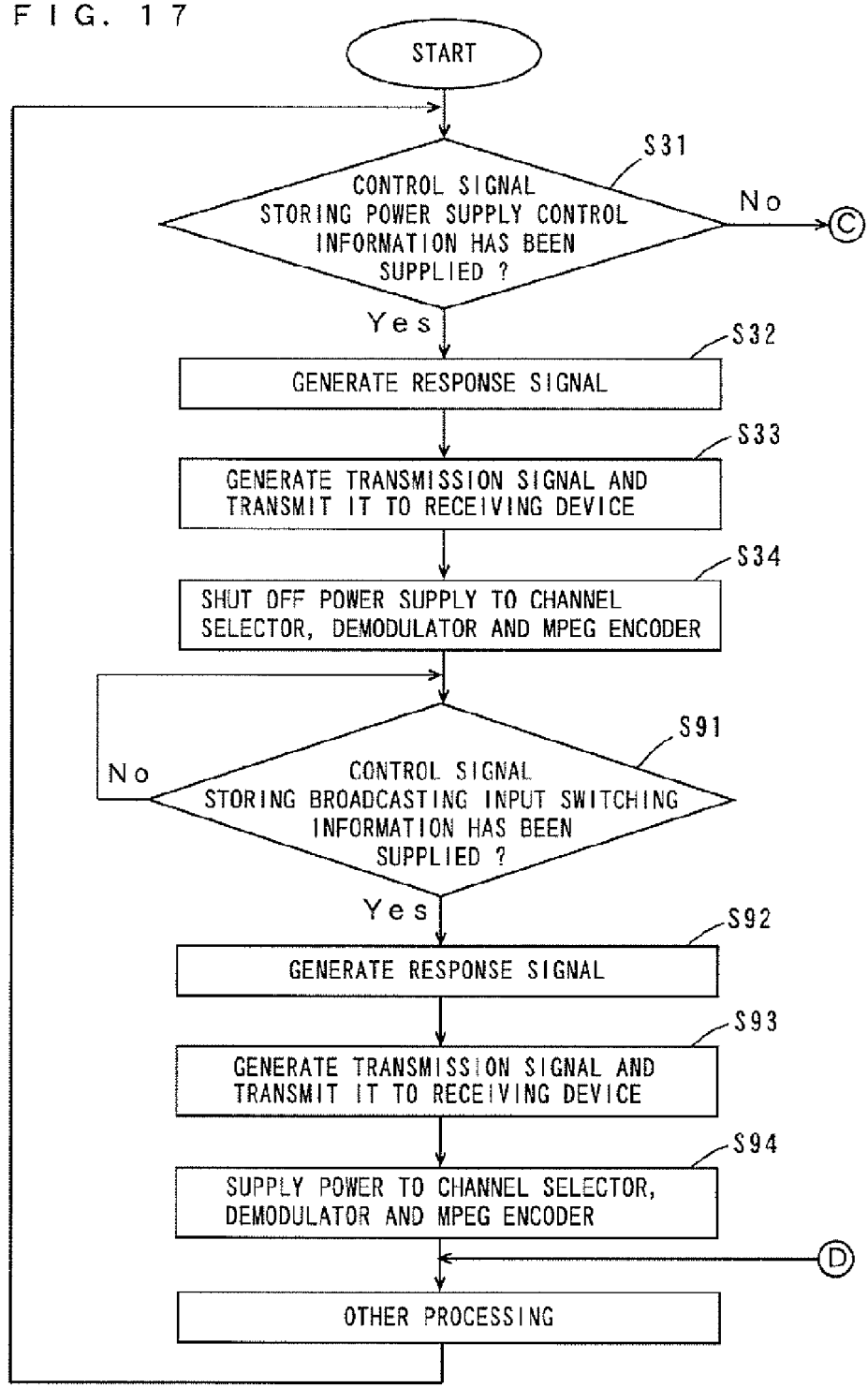
FIG. 17 is a flowchart showing input switching processing in a transmitting device.

Next, the input switching processing in the communication system 4000 according to the present embodiment is described using the drawings. FIGS. 15 and 16 are flowcharts showing the input switching processing in the receiving device 600, and FIG. 17 is a flowchart showing the input switching process in the transmitting device 300.

(b-1) Operation of Receiving Device

The input switching processing in the receiving device 600 is first described.

As shown in FIG. 15, in the receiving device 600, processing similar to that in steps S21 to S27 described in FIG. 8 is performed.

Next, as shown in FIG. 16, the controller 207 determines whether or not the broadcasting input switching information has been supplied from the input unit 206 (step S71). When the broadcasting input switching information has been supplied, the controller 207 generates the control signal storing the broadcasting input switching information (step S72).

Next, the transmission signal processor 208 generates a transmission signal based on the control signal generated by the controller 207, and the radio signal transceiver 201 transmits the transmission signal to the radio signal transceiver 106 of the transmitting device 300 as a radio signal (step S73).

Next, the controller 207 determines whether or not the response signal corresponding to the control signal generated in step S72 has been extracted by the reception signal processor 202 (step S74). When the response signal has not been extracted, the controller 207 stands by until the response signal is extracted.

When the response signal has been extracted in step S74, the controller 207 generates the power supply control signal, and based on the power supply control signal, the power supply controller 401 starts the power supply to the MPEG decoder 203 (step S75).

Next, the controller 207 determines whether or not the power supply to the MPEG decoder 203 has been completed (step S76). When the power supply has not been completed, the controller 207 generates the information sending signal and the input switching signal (step S77). In step S77, the input switching signal for supplying the information signal of the information storage 601 to the video and audio output unit 205 is generated.

Next, based on the information sending signal and the input switching signal generated in step S77, the information storage 601 supplies the information signal to the input switch 204, and the input switch 204 supplies the information signal to the video and audio output unit 205 (step S78). Thereafter, the processing returns to step S76.

When the power supply to the MPEG decoder 203 has been completed in step S76, the controller 207 determines whether or not the video signal and the audio signal have been decoded in the MPEG decoder 203 (step S79). When the video signal and the audio signal have not been decoded, the processing goes to step S77.

In step S79, when the video signal and the audio signal have been decoded in the MPEG decoder 203, the controller 207 generates the input switching signal (step S80). In step S80, the input switching signal for supplying the video signal and the audio signal decoded by the MPEG decoder 203 to the video and audio output unit 205 is generated.

Next, based on the input switching signal generated in step S80, the input switch 204 supplies the video signal and audio signal decoded by the MPEG decoder 203 to the video and audio output unit 205 (step S81). Thereafter, the processing returns to step S21 of FIG. 15 through other processing.

In step S21 of FIG. 15, when the external input information has not been supplied, the processing in steps S8 to S10 described in FIG. 4 is performed. Thereafter, the processing returns to step S21 of FIG. 15 through other processing as shown in FIG. 16.

(b-2) Operation of Transmitting Device

Next, the input switching processing in the transmitting device 300 is described.

As shown in FIG. 17, in the transmitting device 300, processing similar to that in steps S31 to S34 described in FIG. 9 is first performed.

Next, the controller 110 determines whether or not the control signal storing the broadcasting input switching information has been supplied from the reception signal processor 107 (step S91). When the control signal storing the broadcasting input switching information has been supplied, the controller 110 generates the response signal corresponding to the control signal (step S92).

Next, the transmission signal processor 105 generates the transmission signal based on the response signal generated in step S92, and the radio signal transceiver 106 transmits the transmission signal to the radio signal transceiver 201 of the receiving device 600 as a radio signal (step S93).

Next, the controller 110 generates the power supply control signal, and based on the power supply control signal, the power supply controller 301 supplies the power to the channel selector 101, the demodulator 102, and the MPEG encoder 104 (step S94). Thereafter, the processing returns to step S31 through other processing.

In step S31, when the control signal storing the power supply control information has not been supplied, the processing in steps S16 to steps S18 described in FIG. 6 is performed. Thereafter, as shown in FIG. 17, the processing returns to step S31 through other processing.

(c) Effects

As described above, in the communication system 4000 according to the present embodiment, similar to the communication system 2000 of FIG. 7, when the external input signal has been supplied to the video and audio output unit 205, the power supply to the channel selector 101, the demodulator 102, and the MPEG encoder 104 of the transmitting device 300, and the MPEG decoder 203 of the receiving device 600 are shut off. This can sufficiently reduce power consumption of the transmitting device 300 and the receiving device 600.

Moreover, since data communication is not performed between the transmitting device 300 and the receiving device 600, the power consumption of the transmitting device 300 and the receiving device 600 can be further reduced.

Furthermore, the receiving device 600 is provided with the information storage 601. Here, in the present embodiment, when the external input signal supplied to the video and audio output unit 205 is switched to the video signal and the audio signal based on the television broadcasting signal, the power supply to the MPEG decoder 203 is restarted. At this time, a predetermined time is required until the power supply to the MPEG decoder 203 is completed.

Thus, when the external input signal supplied to the video and audio output unit 205 is directly switched to the output signal of the MPEG decoder 203 in the input switch 204 of the receiving device 600, in some cases, time for the power supply to the MPEG decoder 203 may not be sufficiently assured, so that the MPEG decoder 203 cannot decode the video signal and the audio signal. This causes a period of time when the video signal and the audio signal are not supplied to the video and audio output unit 205 to occur. In this case, since no image is displayed on the video and audio output unit 205, the viewer becomes anxious about whether or not the communication system 4000 is normally operating for a moment. This causes the viewer to feel uncomfortable.

Consequently, according to the present embodiment, when the external input signal supplied to the video and audio output unit 205 is switched to the video signal and the audio signal based on the television broadcasting signal, if the power supply to the MPEG decoder 203 has not been completed, the information signal of the information storage 601 is supplied to the video and audio output unit 205. This allows a predetermined image to be displayed on the video and audio output unit 205. As a result, the viewer can recognize the fact that the communication system 4000 is operating normally.

Moreover, after the power supply to the MPEG decoder 203 has been completed, when the decoding of the video signal and the audio signal has not been completed in the MPEG decoder 203, the information signal of the information storage 601 is supplied to the video and audio output unit 205. For example, even if, the video signal and the audio signal based on the television broadcasting signal have not been transmitted to the receiving device 600 due to the incomplete power supply to the channel selector 101, the demodulator 102 or the MPEG encoder 104 of the transmitting device 300, the predetermined image can be displayed on the video and audio output unit 205.

While the processing in steps S75 to S81 is performed after the response signal is supplied to the controller 207 in the above-described embodiment as shown in FIG. 16, the processing in step S74 may not be provided. That is, even if the response signal is not supplied to the controller 207 in step S74, the processing in steps S75 to S81 may be performed.

(5) Methods for Inputting External Input Switching Information and Broadcasting Input Switching Information In the above-described first to fourth embodiments, the input of the external input switching information and the broadcasting input switching information from the input unit 206 can be performed by the following methods.

For example, an external input button and a transmitting device input button are provided in the remote controller, and pushing these buttons allows the external input information or the broadcasting input switching information to be inputted.

Also, as another method, one input switching button is provided in the remote controller, and the controller 207 selects one of the external input switching information and the broadcasting input switching information based on an internal state of the receiving devices 200, 400, 500, 600 when the user pushes the input switching button. For example, when the user pushes the input switching button, when the external input signal has been supplied to the video and audio output unit 205, the controller 207 selects the broadcasting input switching information. On the other hand, when the user pushes the input switching button, when the video signal and the audio signal based on the television broadcasting signal have been supplied to the video and audio output unit 205, the controller 207 selects the external input switching information.

(6) Other Examples of Method for Inputting Video Signal and Audio Signal of External Equipment In the above-described first to fourth embodiments, for example, external equipment may be further connected to the input switch 103 or the MPEG encoder 104 so that the video signal and the audio signal generated by the external equipment may be inputted through the input switch 103 or the MPEG encoder 104.

(7) Regarding Receiving Device

While the case where the video and audio output unit 205 includes the display device and the audio output device is described in the above-described embodiments, the configuration of the video and audio output unit 205 is not limited to this. For example, in the case where the receiving devices 200, 400, 500, 600 are recording and reproducing devices that respectively record information on a recording medium such as a video tape, DVD or HD (hard disk), and reproduce the information recorded on the recording medium, the video and audio output unit 205 includes a video signal output terminal and an audio signal output terminal. In this case, the display device and the audio output device can be connected to the video signal output terminal and the audio signal output terminal, respectively.

(8) Regarding Still Picture Extractor and Information Storage

While the still picture extractor 501 extracts and stores the still picture signal after the still picture signal has been decoded by the MPEG decoder 203 in the receiving device 500 described in FIG. 10, the still picture signal may be extracted from the video signal based on the television broadcasting signal decoded by the MPEG decoder 203.

Moreover, in the receiving device 500, the information storage 601 of FIG. 14 may be provided in place of the still picture extractor 501. Furthermore, in the receiving device 600 of FIG. 14, the still picture extractor 501 of FIG. 10 may be provided in place of the information storage 601.

(9) Other Embodiments

While the communication systems that receive analog television broadcasting signals are described in the above-described embodiments, communication systems that respectively receive a digital television broadcasting signal are now described. FIGS. 18 to 21 are block diagrams showing configurations of transmitting devices adapted to the digital television broadcasting signal.

Figure 18:
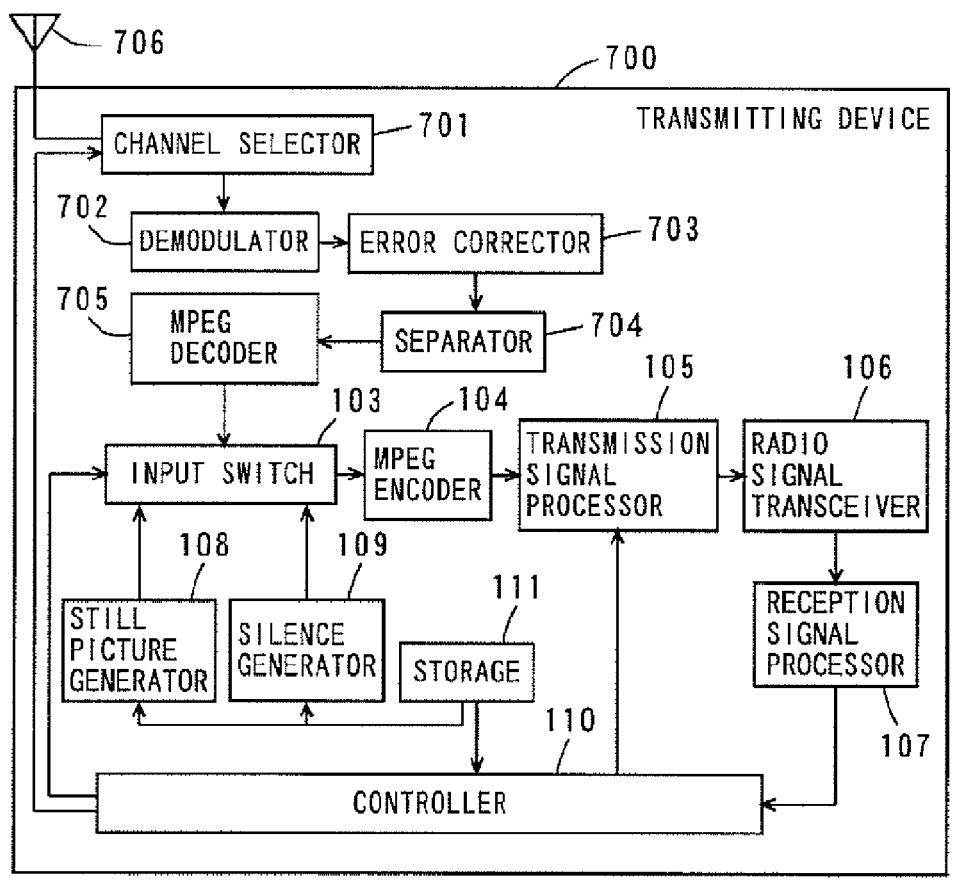
FIG. 18 is a block diagram showing a configuration of a transmitting device adapted to a digital television broadcasting signal.
Figure 19:
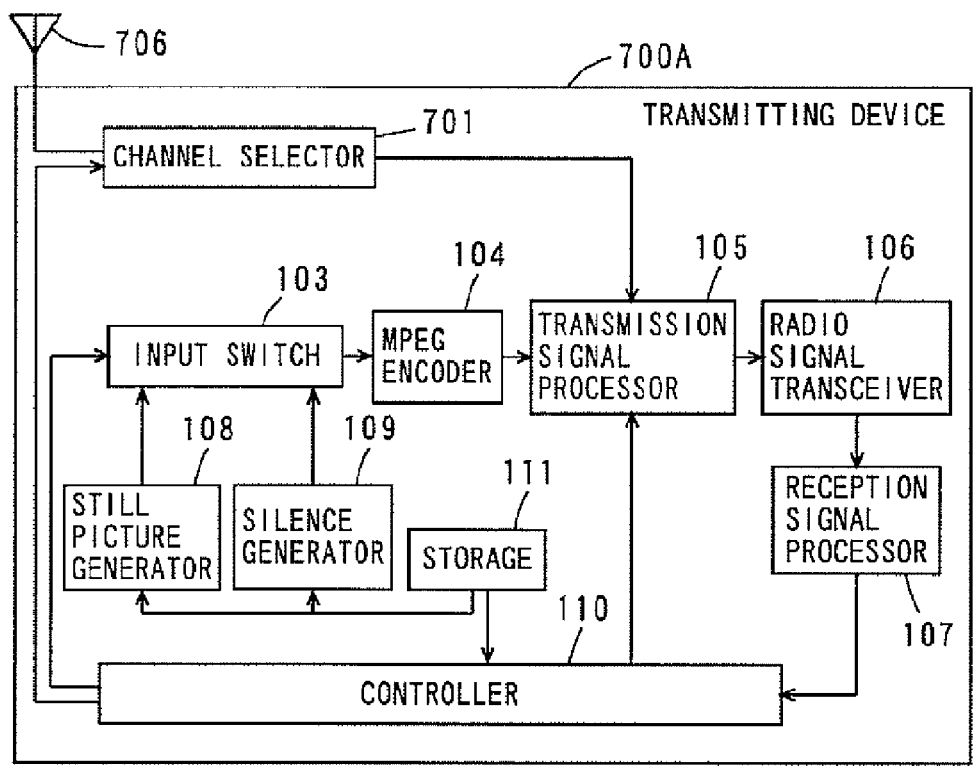
FIG. 19 is a block diagram showing a configuration of a transmitting device adapted to a digital television broadcasting signal.
Figure 20:
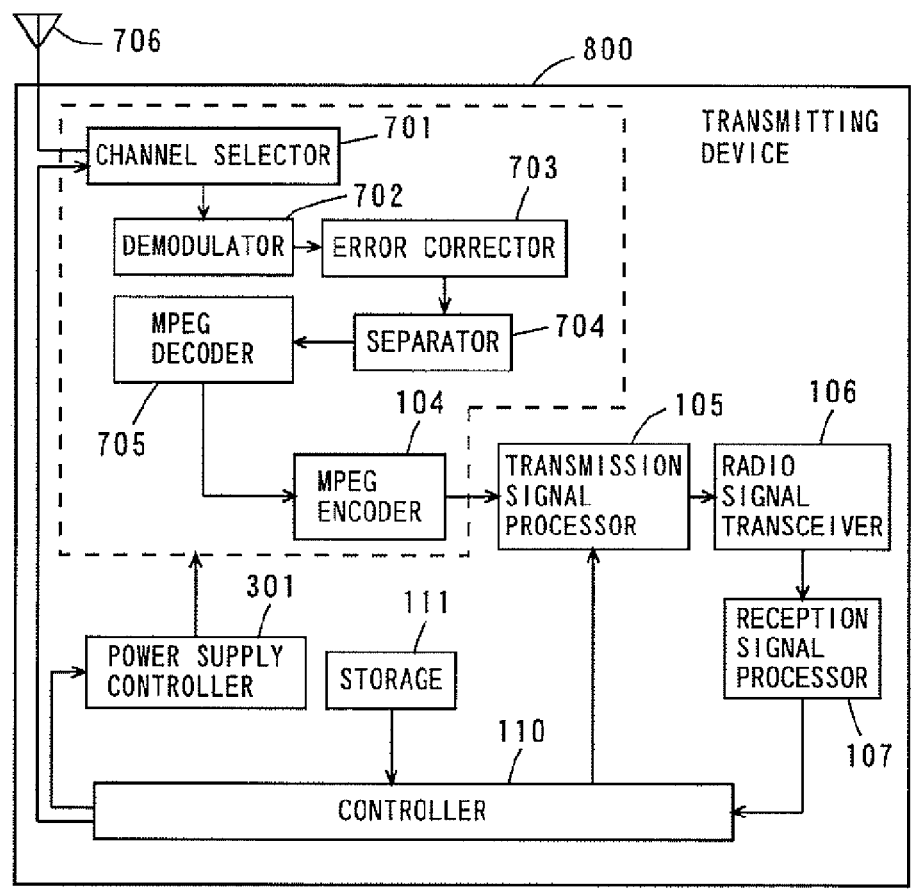
FIG. 20 is a block diagram showing a configuration of a transmitting device adapted to a digital television broadcasting signal.

When the communication systems according to the above-described first to fourth embodiments are adapted to the digital television broadcasting signal, in the communication systems 1000, 3000 of FIGS. 1 and 10, a transmitting device 700 or a transmitting device 700A described in FIGS. 18 and 19 may be used in place of the transmitting device 100, and in the communication systems 2000, 4000 of FIGS. 7 and 14, a transmitting device 800 or a transmitting device 800A described in FIGS. 20 and 21 may be used in place of the transmitting device 300.

Hereinafter, the respective transmitting devices of FIGS. 18 to 21 are described.

Different points of the transmitting device 700 shown in FIG. 18 from the transmitting device 100 of the FIGS. 1 and 10 are as follows.

As shown in FIG. 18, the transmitting device 700 includes a channel selector 701, a demodulator 702, an error corrector 703, a separator 704, an MPEG decoder 705, the input switch 103, the MPEG encoder 104, the transmission signal processor 105, the radio signal transceiver 106, the reception signal processor 107, the still picture generator 108, the silence generator 109, the controller 110, and the storage 111.

The channel selector 701 of the transmitting device 700 selects a digital television broadcasting signal of a channel corresponding to the channel selection signal generated by the controller 110 from a plurality of digital television broadcasting signals corresponding to a plurality of channels, which are inputted through an antenna 706.

The demodulator 702 demodulates the digital television broadcasting signal selected by the channel selector 701 to generate a transport stream.

The error corrector 703 corrects an error of the transport stream generated by the demodulator 702.

The separator 704 separates a digital video signal and a digital audio signal from the transport stream subjected to the error correction by the error corrector 703.

The MPEG decoder 705 decodes the digital video signal and the digital audio signal separated by the separator 704 to generate an analog video signal and an analog audio signal.

Based on the input switching signal generated by the controller 110, the input switch 103 outputs the analog video signal and audio signal generated by the MPEG decoder 705, or outputs the still picture signal generated by the still picture generator 108 and the silence signal generated by the silence generator 109.

By using the transmitting device 700 having the above-described configuration in place of the transmitting device 100 of FIGS. 1 and 10, effects similar to those of the communication systems 1000, 3000 of FIGS. 1 and 10 can also be obtained in the communication system adapted to the digital television broadcasting.

Different points of the transmitting device 700A of FIG. 19 from the transmitting device 700 of FIG. 18 are as follows.

As shown in FIG. 19, the transmitting device 700A dose not include the demodulator 702, the error corrector 703, the separator 704, and the MPEG decoder 705, and the digital television broadcasting signal selected by the channel selector 701 is supplied to the transmission signal processor 105.

Based on the input switching signal generated by the controller 110, the input switch 103 outputs the still picture signal generated by the still picture generator 108 and the silence signal generated by the silence generator 109, or does not outputs any signal.

The transmission signal processor 105 selects the signal compressed by the MPEG encoder 104 or the digital television broadcasting signal supplied from the channel selector 701, based on the input switching signal generated by the controller 110, and converts the selected signal and the response signal generated by the controller 110 into signals compliant with the predetermined communication protocol (for example, IEEE802.11a), respectively, and generates the transmission signal by applying the predetermined modulation processing, amplification processing and the like.

By using the transmitting device 700A having the above-described configuration in place of the transmitting device 100 of FIGS. 1 and 10, effects similar to those of the communication systems 1000, 3000 of FIGS. 1 and 10 can also be obtained in the communication system adapted to the digital television broadcasting.

Different points of the transmitting device 300 shown in FIG. 20 from the transmitting device 300 of the FIGS. 7 and 14 are as follows.

As shown in FIG. 20, the transmitting device 800 includes the channel selector 701, the demodulator 702, the error corrector 703, the separator 704, the MPEG decoder 705, the MPEG encoder 104, the transmission signal processor 105, the radio signal transceiver 106, the reception signal processor 107, the controller 110, the storage 111, and the power supply controller 301.

The channel selector 701, the demodulator 702, the error corrector 703, the separator 704, and the MPEG decoder 705 perform the roles described in FIG. 18.

The MPE encoder 104 compression-encodes the video signal and the audio signal generated by the MPEG decoder 705 in an MPEG method.

The power supply controller 301 controls the power supply to the channel selector 701, the demodulator 702, the error corrector 703, the separator 704, the MPEG decoder 705 and the MPEG encoder 104, based on the power supply control signal generated by the controller 110.

By using the transmitting device 800 having the above-described configuration in place of the transmitting device 300 of FIGS. 7 and 14, effects similar to those of the communication systems 2000, 4000 of FIGS. 7 and 14 can also be obtained in the communication system adapted to the digital television broadcasting.

Different points of the transmitting device 800A shown in FIG. 21 from the transmitting device 800 of FIG. 20 are as follows.

As shown in FIG. 21, the transmitting device 800 dose not include the demodulator 702, the error corrector 703, the separator 704, the MPEG decoder 705, and the MPEG encoder 104, and the digital television broadcasting signal selected by the channel selector 701 is supplied to the transmission signal processor 105.

The transmission signal processor 105 converts the digital television broadcasting signal supplied from the channel selector 701, and the response signal generated by the controller 110 into signals compliant with the predetermined communication protocol (e.g. IEEE 802, 11a), respectively, and generates the transmission signal by applying the predetermined modulation processing, amplification processing and the like.

The power supply controller 301 controls the power supply to the channel selector 701 based on the power supply control signal generated by the controller 110.

By using the transmitting device 800A having the above-described configuration in place of the transmitting device 300 of FIGS. 7 and 14, effects similar to those of the communication systems 2000, 4000 of FIGS. 7 and 14 can also be obtained in the communication system adapted to the digital television broadcasting.

(10) Correspondence Between Respective Constituent Elements of Claims and Respective Components in Embodiments In the embodiments described above, the channel selector 101, the demodulator 102, and the MPEG encoder 104 correspond to a receiver, the radio signal transceiver 106 corresponds to a first communicator, the controller 110 or the power supply controller 301 corresponds to a first controller, the radio signal transceiver 201 corresponds to a second communicator, the external signal input unit 210 corresponds to an acquirer, and the input switch 204 and the controller 207 correspond to a first selector.

Moreover, the input switch 103 and the controller 110 correspond to a second selector, the MPEG encoder 104 corresponds to an encoder, the MPEG decoder 203 corresponds to a decoder, the controller 207 and the power supply controller 401 correspond to a second controller, the still picture extractor 501 or the information storage 601 corresponds to an information generator, the input unit 206 corresponds to an instructor, the controller 207 corresponds to a control signal generator, and the controller 110 corresponds to a response signal generator.

Furthermore, the channel selector 701, the demodulator 702, the error corrector 703, the separator 704, the MPEG decoder 705, the input switch 103 and the MPEG encoder 104 correspond to a receiver.

INDUSTRIAL APPLICABILITY

The present invention is effectively applicable to a broadcasting system, a receiving device, a broadcasting method of a television broadcasting or the like.

The invention claimed is:
1. A communication system that receives a broadcasting signal, and to which an external device can be connected,
said communication system comprising a transmitting device and a receiving device,
wherein said transmitting device includes:
a receiver that receives said broadcasting signal;
a first communicator that transmits said broadcasting signal received by said receiver to said receiving device;
a first controller that controls the transmission of said broadcasting signal to said receiving device;
a still picture generator that generates a still picture signal; and
a second selector that selectively outputs said broadcasting signal from said receiver and said still picture signal from said still picture generator to said first communicator,
said receiving device includes:
a second communicator that receives said broadcasting signal transmitted from said transmitting device;
an acquirer that acquires an external signal from said external device; and
a first selector that selectively outputs the broadcasting signal from said second communicator and the external signal from said acquirer, wherein
said first controller controls the transmission of said broadcasting signal so that an amount of said broadcasting signal at the time of output of said external signal by said first selector is smaller than an amount of said broadcasting signal at the time of output of said broadcasting signal by said first selector,
said first controller outputs said still picture signal by said second selector when said external signal is outputted by said first selector, and
said first communicator transmits said still picture signal outputted by said second selector to said receiving device.

2. The communication system according to claim 1, wherein said first controller stops the transmission of said broadcasting signal to said receiving device when said external signal is outputted by said first selector.

3. The communication system according to claim 1, wherein said transmitting device further includes a silence signal generator that generates a silence signal, and wherein
said first controller outputs said still picture signal and said silence signal by said second selector when said external signal is outputted by said first selector, and
said first communicator transmits said still picture signal and said silence signal outputted by said second selector to said receiving device.

4. A communication system that receives a broadcasting signal, and to which an external device can be connected,
said communication system comprising a transmitting device and a receiving device,
wherein said transmitting device includes:
a receiver that receives said broadcasting signal;
a first communicator that transmits said broadcasting signal received by said receiver to said receiving device; and
a first controller that controls the transmission of said broadcasting signal to said receiving device, and
said receiving device includes:
a second communicator that receives said broadcasting signal transmitted from said transmitting device;
an acquirer that acquires an external signal from said external device; and
a first selector that selectively outputs the broadcasting signal from said second communicator and the external signal from said acquirer, wherein
said first controller controls the transmission of said broadcasting signal so that an amount of said broadcasting signal at the time of output of said external signal by said first selector is smaller than an amount of said broadcasting signal at the time of output of said broadcasting signal by said first selector, and said first controller stops a power supply to said receiver when said external signal is outputted by said the first selector.

5. A communication system that receives a broadcasting signal, and to which an external device can be connected, said communication system comprising a transmitting device and a receiving device, wherein said transmitting device includes:

a receiver that receives said broadcasting signal;

a first communicator that transmits said broadcasting signal received by said receiver to said receiving device; and a first controller that controls the transmission of said broadcasting signal to said receiving device, and said receiving device includes:

a second communicator that receives said broadcasting signal transmitted from said transmitting device;

an acquirer that acquires an external signal from said external device; and a first selector that selectively outputs the broadcasting signal from said second communicator and the external signal from said acquirer, wherein said first controller controls the transmission of said broadcasting signal so that an amount of said broadcasting signal at the time of output of said external signal by said first selector is smaller than an amount of said broadcasting signal at the time of output of said broadcasting signal by said first selector, and said receiver includes an encoder that encodes said broadcasting signal, said second communicator includes a decoder that decodes the broadcasting signal encoded by said encoder, and said receiving device further includes a second controller that stops a power supply to said decoder when said external signal is outputted by said first selector.

6. A communication system that receives a broadcasting signal, and to which an external device can be connected, said communication system comprising a transmitting device and a receiving device, wherein said transmitting device includes:

a receiver that receives said broadcasting signal;

a first communicator that transmits said broadcasting signal received by said receiver to said receiving device; and a first controller that controls the transmission of said broadcasting signal to said receiving device, and said receiving device includes:

a second communicator that receives said broadcasting signal transmitted from said transmitting device;

an acquirer that acquires an external signal from said external device; and a first selector that selectively outputs the broadcasting signal from said second communicator and the external signal from said acquirer, wherein said first controller controls the transmission of said broadcasting signal so that an amount of said broadcasting signal at the time of output of said external signal by said first selector is smaller than an amount of said broadcasting signal at the time of output of said broadcasting signal by said first selector, and said receiving device further includes an information generator that generates a predetermined information signal; and an instructor that instructs switching of the signal to be outputted from said first selector, wherein when the switching from said external signal to said broadcasting signal is instructed by said instructor, said first selector outputs said broadcasting signal after outputting said predetermined information signal generated by said information generator for a predetermined period of time.

7. The communication system according to claim 6, wherein said predetermined period of time is a period of time from a time when the switching to said broadcasting signal is instructed by said instructor to a time when said broadcasting signal is enabled to be outputted.

8. The communication system according to claim 6, wherein said receiving device further includes a control signal generator that generates a control signal indicating that the switching of the signal has been instructed by said instructor, and wherein said second communicator transmits said control signal to said transmitting device, and when the switching from said external signal to said broadcasting signal is instructed by said instructor, said first selector outputs the information signal generated by said information generator for a period of time from the time when said control signal is transmitted to said transmitting device by said second communicator to the time when said broadcasting signal is enabled to be outputted.

9. The communication system according to claim 6, wherein said receiving device further includes a control signal generator that generates a control signal indicating that the switching of the signal has been instructed by said instructor, said second communicator transmits said control signal to said transmitting device, said first communicator receives said control signal transmitted from said receiving device, said transmitting device further includes a response signal generator that generates a response signal in response to a reception of said control signal by said first communicator, said first communicator transmits said response signal generated by said response signal generator to said receiving device, said second communicator receives said response signal transmitted by said transmitting device, and when the switching from said external signal to said broadcasting signal is instructed by said instructor, said first selector outputs the predetermined information signal generated by said information generator for a period of time from a time when said response signal is received by said second communicator to a time when said broadcasting signal is enabled to be outputted.

10. The communication system according to claim 6, wherein said information generator extracts said predetermined information signal from the signal received by said second communicator.

11. The communication system according to claim 6, wherein said information generator prestores said predetermined information signal.

12. The communication system according to claim 6, wherein said predetermined information signal is a still picture signal.

13. The communication system according to claim 4, wherein said receiving device further includes:

an information generator that generates a predetermined information signal, and an instructor that instructs switching of the signal to be outputted from said first selector, and wherein when the switching from said external signal to said broadcasting signal is instructed by said instructor, said first controller starts a power supply to said receiver, and when the switching from said external signal to said broadcasting signal is instructed by said instructor, said first selector outputs said broadcasting signal after outputting said predetermined information signal generated by said information generator for a predetermined period of time.

14. A communication system that receives a broadcasting signal, and to which an external device can be connected,
said communication system comprising a transmitting device and a receiving device,
wherein said transmitting device includes:
a receiver that receives said broadcasting signal;
a first communicator that transmits said broadcasting signal received by said receiver to said receiving device; and
a first controller that controls the transmission of said broadcasting signal to said receiving device, and
said receiving device includes:
a second communicator that receives said broadcasting signal transmitted from said transmitting device;
an acquirer that acquires an external signal from said external device; and
a first selector that selectively outputs the broadcasting signal from said second communicator and the external signal from said acquirer, wherein
said first controller controls the transmission of said broadcasting signal so that an amount of said broadcasting signal at the time of output of said external signal by said first selector is smaller than an amount of said broadcasting signal at the time of output of said broadcasting signal by said first selector, and said first communicator and said second communicator perform radio communication.

15. A communication method between a transmitting device that receives a broadcasting signal and a receiving device to which an external device can be connected, comprising:
receiving said broadcasting signal by said transmitting device;
transmitting said received broadcasting signal to said receiving device by said transmitting device;
receiving said broadcasting signal transmitted from said transmitting device by said receiving device;
acquiring an external signal from said external device in said receiving device;
selectively outputting said broadcasting signal and said external signal by said receiving device;
controlling the transmission of said broadcasting signal so that an amount of said broadcasting signal transmitted from said transmitting device to said receiving device when said external signal is outputted by said receiving device is smaller than an amount of said broadcasting signal transmitted from said transmitting device to said receiving device when said broadcasting signal is outputted by said receiving device; and
generating a still picture signal in said transmitting device, wherein controlling includes stopping the transmission of said broadcasting signal to the receiving device, and stopping includes transmitting the still picture signal to said receiving device.

16. The communication method according to claim 15, further comprising generating a silence signal in said transmitting device,
wherein stopping includes transmitting said still picture signal and said silence signal to said receiving device.

17. The communication method according to claim 15, wherein receiving said broadcasting signal by said transmitting device includes receiving said broadcasting signal by a receiver, and
said controlling includes stopping power supply to said receiver.

18. The communication method according to claim 15, wherein the receiving said broadcasting signal by said transmitting device includes encoding said broadcasting signal by an encoder, and
the receiving said broadcasting signal transmitted from said transmitting device by said receiver includes decoding said broadcasting signal by a decoder,
the communication method further comprising stopping power supply to said decoder when said external signal is outputted by said receiving device.

* * * * *

UNITED STATES PATENT AND TRADEMARK OFFICE
CERTIFICATE OF CORRECTION

PATENT NO. : 7,990,479 B2
APPLICATION NO. : 11/569202
DATED : August 2, 2011
INVENTOR(S) : Yoshikatsu Hattori It is certified that error appears in the above-identified patent and that said Letters Patent is hereby corrected as shown below:

On cover page (22) PCT Filed (page 1) of the printed patent, change "Mar. 19, 2005" to --May 19, 2005--.

On cover page (56) Foreign Patent Documents (page 2, line 6) of the printed patent, please delete "JP 2001-007722 11/2001", which is a duplicate of the listing on page 2, line 5 (but for an error in the date of the publication).

On cover page (56) Other documents (page 2, line 13) of the printed patent, change "English language Abstract of JP 2002-158888, May 31, 2002" to --English language Abstract and Machine Translation of JP 2002-158888, May 31, 2002--.

Signed and Sealed this
Eighth Day of May, 2012

David J. Kappos
*Director of the United States Patent and Trademark Office*